(12) United States Patent
Feldstein et al.

(10) Patent No.: US 8,339,086 B2
(45) Date of Patent: Dec. 25, 2012

(54) SYSTEM FOR SYNCRONIZING A PLURALITY OF ROLLER SHADES USING VARIABLE LINEAR VELOCITIES

(75) Inventors: George Feldstein, Cresskill, NJ (US);
Mark LaBosco, New City, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 139 days.

(21) Appl. No.: 12/912,326

(22) Filed: Oct. 26, 2010

(65) Prior Publication Data

US 2012/0050596 A1    Mar. 1, 2012

Related U.S. Application Data

(63) Continuation-in-part of application No. 12/871,516, filed on Aug. 30, 2010.

(51) Int. Cl.
*H02P 3/00*    (2006.01)
*H02P 7/29*    (2006.01)

(52) U.S. Cl. .......... 318/470; 318/62; 318/255; 318/453; 318/466; 160/127; 160/405; 370/449; 370/465

(58) Field of Classification Search .................. 318/266, 318/283, 466, 468, 62, 255, 453, 470; 160/120, 160/7, 310, 127, 405; 370/449, 465
See application file for complete search history.

(56) References Cited

U.S. PATENT DOCUMENTS

| | | | | |
|---|---|---|---|---|
| 5,737,279 A | * | 4/1998 | Carter | 367/173 |
| 5,793,174 A | * | 8/1998 | Kovach et al. | 318/468 |
| 5,848,634 A | * | 12/1998 | Will et al. | 160/310 |
| 5,990,646 A | * | 11/1999 | Kovach et al. | 318/468 |
| 6,057,658 A | * | 5/2000 | Kovach et al. | 318/16 |
| 6,100,659 A | * | 8/2000 | Will et al. | 318/466 |
| 6,181,089 B1 | * | 1/2001 | Kovach et al. | 318/16 |
| 6,983,783 B2 | * | 1/2006 | Carmen et al. | 160/120 |
| 7,079,045 B2 | * | 7/2006 | Baud et al. | 340/12.22 |
| 7,281,565 B2 | * | 10/2007 | Carmen et al. | 160/310 |
| 7,344,260 B2 | * | 3/2008 | Derenski | 359/601 |
| 7,389,806 B2 | * | 6/2008 | Kates | 160/5 |
| 7,466,090 B2 | * | 12/2008 | Meewis et al. | 318/280 |
| 7,537,040 B2 | * | 5/2009 | Carmen et al. | 160/120 |
| 7,599,612 B2 | * | 10/2009 | Moseley et al. | 388/811 |
| 7,635,018 B2 | * | 12/2009 | Carmen et al. | 160/310 |
| 7,723,939 B2 | * | 5/2010 | Carmen, Jr. | 318/466 |
| 7,724,687 B2 | * | 5/2010 | Autret et al. | 370/255 |

(Continued)

OTHER PUBLICATIONS

Office Action dated May 3, 2012 and copending U.S. Appl. No. 12/871,516.

(Continued)

*Primary Examiner* — Paul Ip
(74) *Attorney, Agent, or Firm* — Crestron Electronics Inc.

(57) ABSTRACT

Presented is a system for synchronizing movement of roller shades each from a first position to a common second position. The system includes a master controller, a plurality of optical assemblies each configured to obtain information related to the position of one of the roller shades, and a plurality of motor assemblies. Each of the motor assemblies is configured for receiving the position information from one of the plurality of optical assemblies, receiving a master shade movement time from the master controller, and moving one of the of roller shades from the first position to the common second position in response to the received position information so that the roller shade arrives at the common second position simultaneously with the other roller shades in a time equal to the master shade movement time.

37 Claims, 27 Drawing Sheets

U.S. PATENT DOCUMENTS

| | | | |
|---|---|---|---|
| 7,737,653 B2 * | 6/2010 | Carmen et al. | 318/466 |
| 7,839,109 B2 * | 11/2010 | Carmen et al. | 318/466 |
| 8,065,039 B2 * | 11/2011 | Mullet et al. | 700/279 |
| 8,125,165 B2 * | 2/2012 | Cieslik | 318/101 |
| 8,125,167 B1 * | 2/2012 | Mullet et al. | 318/265 |
| 2003/0098133 A1 * | 5/2003 | Palmer | 160/310 |
| 2004/0222900 A1 * | 11/2004 | Baud et al. | 340/825.72 |
| 2005/0237957 A1 * | 10/2005 | Autret et al. | 370/310 |
| 2005/0280897 A1 * | 12/2005 | Derenski | 359/612 |
| 2006/0000558 A1 * | 1/2006 | Fennell | 160/7 |
| 2006/0185799 A1 * | 8/2006 | Kates | 160/5 |
| 2007/0221338 A1 * | 9/2007 | Meewis et al. | 160/7 |
| 2007/0272374 A1 * | 11/2007 | Moseley et al. | 160/310 |
| 2007/0273309 A1 * | 11/2007 | Carmen | 318/16 |
| 2007/0295459 A1 * | 12/2007 | Carmen et al. | 160/310 |
| 2007/0295460 A1 * | 12/2007 | Carmen et al. | 160/310 |
| 2008/0191837 A1 * | 8/2008 | Stocker | 340/3.51 |
| 2008/0192767 A1 * | 8/2008 | Howe et al. | 370/449 |
| 2008/0198035 A1 * | 8/2008 | Ebbe et al. | 340/825.22 |
| 2008/0258666 A1 * | 10/2008 | Carmen et al. | 318/470 |
| 2008/0260363 A1 * | 10/2008 | Carmen et al. | 388/811 |
| 2008/0309513 A1 * | 12/2008 | Ebbe et al. | 340/825.21 |
| 2008/0313299 A1 * | 12/2008 | Ebbe et al. | 709/208 |
| 2010/0006240 A1 * | 1/2010 | Cieslik | 160/405 |
| 2010/0087958 A1 * | 4/2010 | Mullet et al. | 700/279 |
| 2011/0061818 A1 * | 3/2011 | Geriniere et al. | 160/168.1 P |

OTHER PUBLICATIONS

Office Action dated Aug. 27, 2012 and copending U.S. Appl. No. 12/871,516.

Office Action dated Apr. 30, 2012 and copending U.S. Appl. No. 12/872,267.

Office Action dated Aug. 23, 2012 and copending U.S. Appl. No. 12/872,267.

Office Action dated Jun. 18, 2012 and copending U.S. Appl. No. 12/912,308.

* cited by examiner

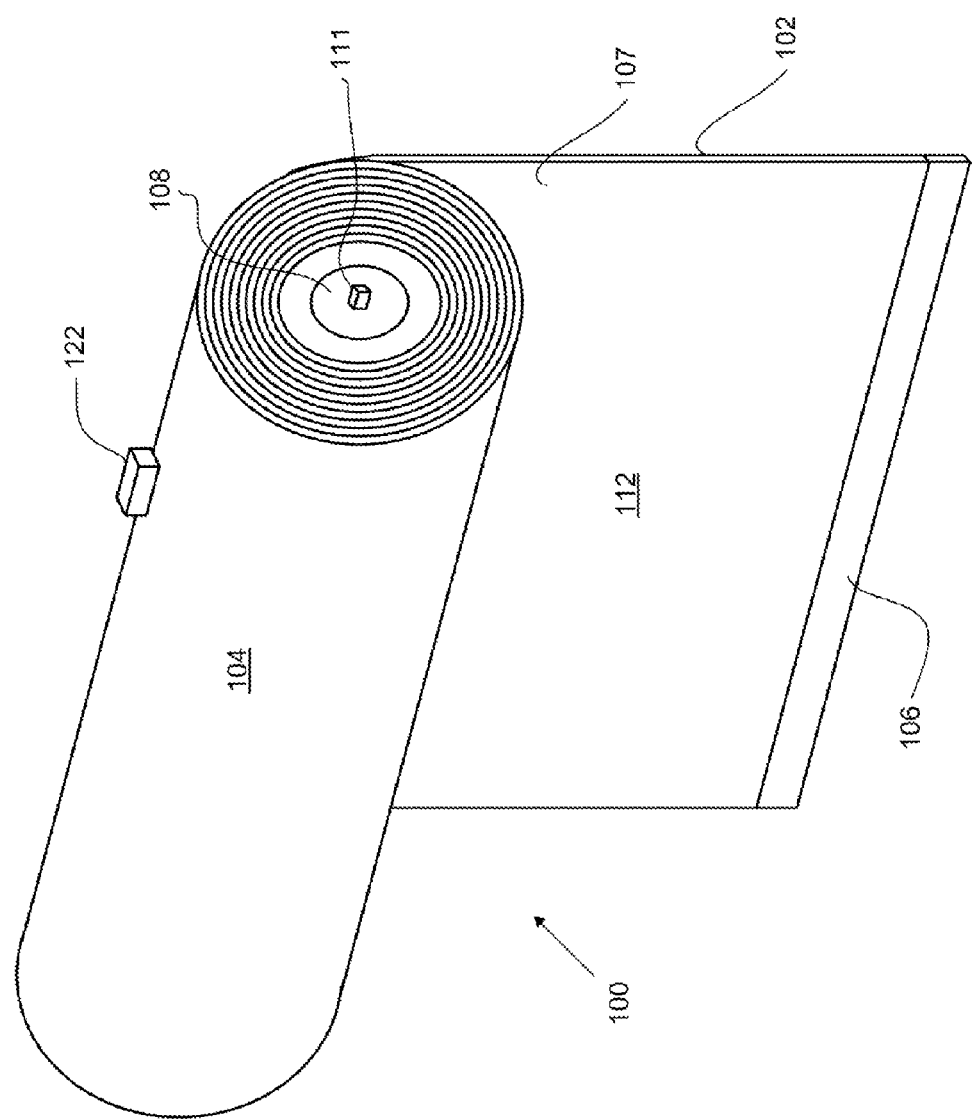

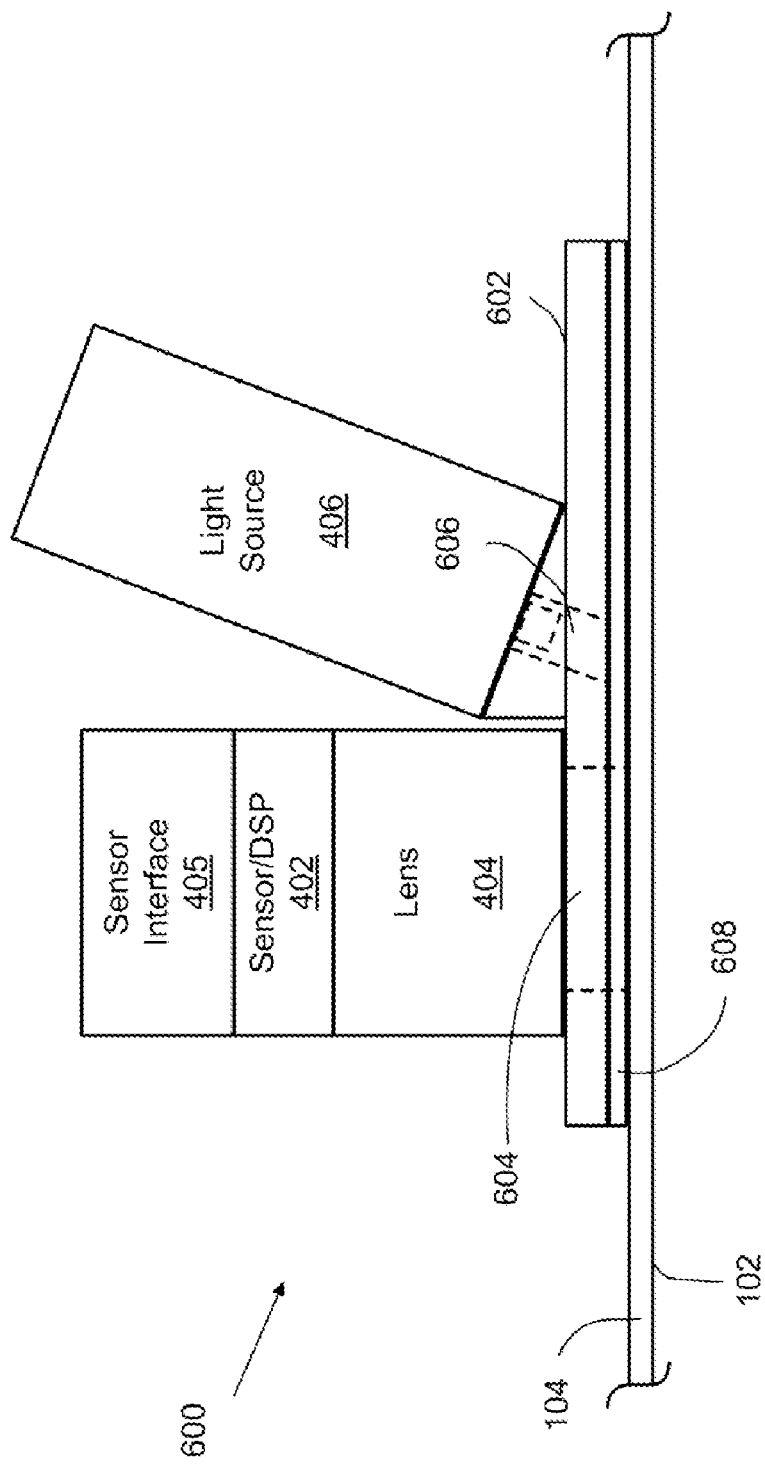

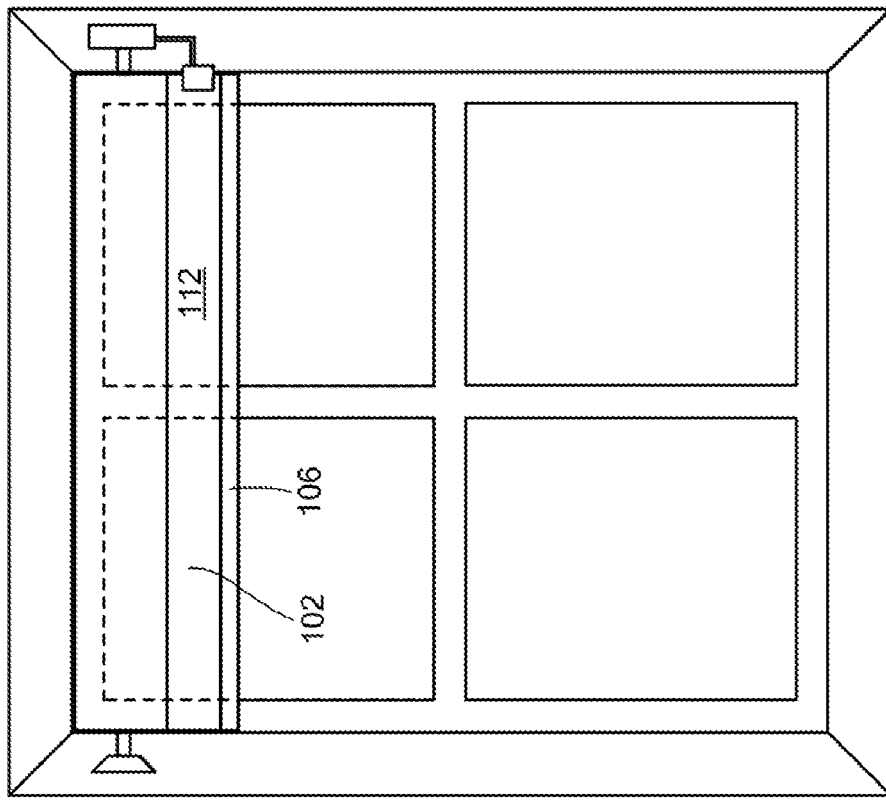
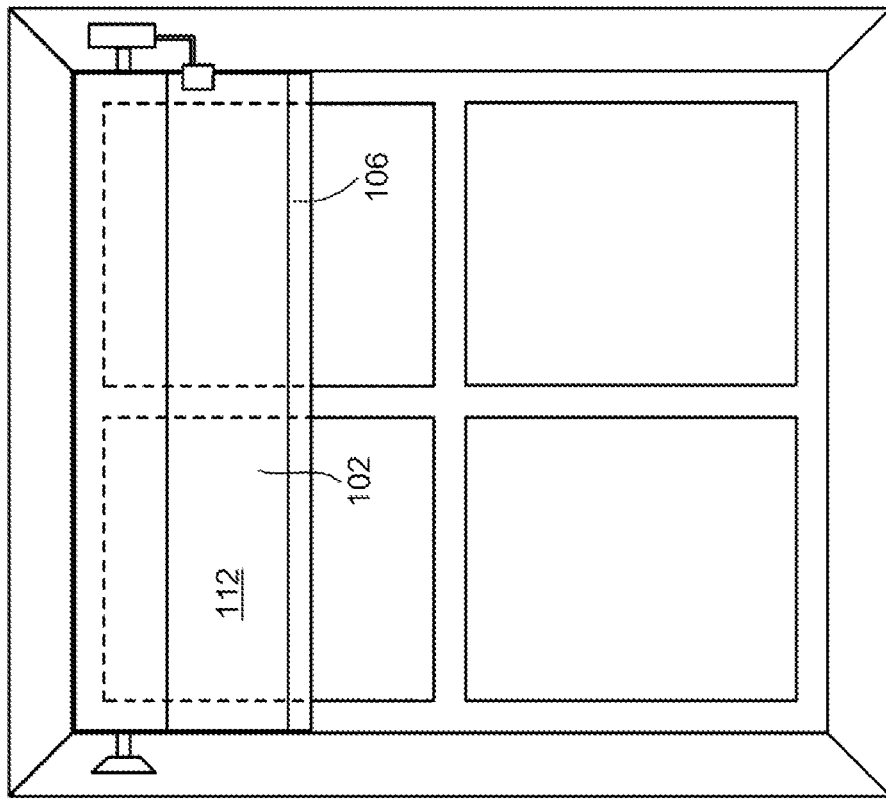

SYSTEM FOR SYNCRONIZING A PLURALITY OF ROLLER SHADES USING VARIABLE LINEAR VELOCITIES

BACKGROUND OF THE INVENTION

1. Technical Field

The present invention generally relates to raising and lowering roller shades, and more particularly to raising and lowering roller shades to a selected position at variable linear shade velocities to prevent overshooting or undershooting the selected shade position, and to raising and lowering a plurality of roller shades synchronously.

2. Background Art

A typical motorized roller shade includes a flexible shade fabric wound onto an elongated roller tube. The roller tube is rotatably supported so that a lower end of the flexible shade fabric can be raised (i.e., wound) or lowered (i.e., unwound) by rotating the roller tube. The roller tube is rotated by a motorized drive system.

A common problem with typical motorized roller shades is that when the shade is raised or lowered, the motorized drive system, which moves the shade at a constant velocity, abruptly starts rotating the shade, winds or unwinds the shade at the constant velocity, and then abruptly stops rotating the shade when the shade reaches a selected position. Consequently, during raising or lowering of the shade, the shade moves with an aesthetically unpleasing "jerky" motion. Further, sometimes the shade undershoots the selected position because the shade is abruptly stopped too early. Other times, the shade overshoots the selected position because the shade is abruptly stopped to late, or because the shade's momentum carries it past the selected position.

Attempts to position correctly a roller shade have included counting the rotations of the shade motor while the shade moves at a constant linear velocity. The linear velocity of a roller shade is typically estimated by determining the rotations per minute (RPMs) of the shade motor and multiplying the RPMs by the estimated changing distance between the last outer layer of fabric rolled on the shade tube and the tube center as the shade fabric is rolled or unrolled. This indirect method of determining linear velocity does not account for variations in shade fabric thickness and the random gaps that develop between the layers of the shade fabric. The accuracy of the positioning of the shade is limited by the accuracy of the motor rotational position measurement.

Another common problem with motorized roller shades is that when multiple roller shades are used to shade a room, and all the shades are raised or lowered at the same constant velocity, there is no guarantee that all the shades will arrive at a selected position at the same time, which is also aesthetically unpleasing.

For example, if one shade is longer than other shades in the same room (e.g., because the shade covers a longer window), the longer shade, moving at a constant velocity, will arrive at the selected position some time after the shorter shades have arrived at the selected position (e.g., all shades moving from the fully closed position to the fully open position). Likewise, if all the shades in a room are of equal length, but are each in different starting positions, each shade, moving at a constant velocity, will arrive at the selected position at a different time.

Therefore, a need exists for a motorized roller shade that starts and stops smoothly while not undershooting or overshooting the selected shade position. Additionally, a need also exists for a motorized roller shade that allows each of a plurality of shades to raise or lower at varying velocity so that each of the plurality of shades arrives at the desired position at the same time.

SUMMARY OF THE INVENTION

It is to be understood that both the general and detailed descriptions that follow are exemplary and explanatory only and are not restrictive of the invention

DISCLOSURE OF THE INVENTION

According to one aspect, the invention involves a system for synchronizing movement of a plurality of roller shades each disposed at a first position to a common second position. Each of the plurality of roller shades includes a flexible shade material having a lower end and a rotatably supported roller tube windingly receiving the flexible shade material. The system includes a master controller, a plurality of optical assemblies each configured for obtaining information related to the position of an associated one of the plurality of roller shades, and a plurality of motor assemblies. Each of the motor assemblies is configured for receiving the position information from an associated one of the plurality of optical assemblies, receiving a master shade movement time from the master controller, and moving the associated one of the plurality of roller shades from the first position to the common second position in response to the received position information so that the associated one of the plurality of roller shades arrives at the common second position simultaneously with the other of the plurality of roller shades in a time equal to the master shade movement time.

In one embodiment, the master controller is further configured for retrieving a shade movement time from each of the plurality of motor assemblies and selecting the longest shade movement time as the master shade movement time.

In another embodiment, each of the plurality of motor assemblies is further configured for transmitting the position information to the master controller.

In still another embodiment, each of the plurality of optical assemblies includes an optical sensor configured for capturing an image frame of the flexible shade material of the associated one of the plurality of roller shades at a plurality of linear positions along the flexible shade material as the lower end of the flexible shade material moves between the first position and the common second position.

In yet another embodiment, each of the plurality of optical assemblies further includes a digital signal processor configured for processing the plurality of captured image frames of the flexible shade material of the associated one of the plurality of roller shades to determine changes in position of the flexible shade material as the lower end of the flexible shade material moves between the first position and the common second position.

In another embodiment, each of the plurality of optical assemblies further includes a light source configured for illuminating the flexible shade material of the associated one of the plurality of roller shades moving past the optical sensor. The light source includes one of an incandescent light, a light emitting diode, or a vertical cavity surface emitting laser.

In still another embodiment, the optical sensor includes one of a high speed digital camera, a charge coupled device, or a complementary metal oxide semiconductor detector.

In yet another embodiment, each of the plurality of motor assemblies includes a motor controller and an associated reversible motor configured for operably engaging the roller tube of the associated one of the plurality of roller shades to rotate the roller tube to move the lower end of the flexible shade material of the associated one of the plurality of roller shades between the first position and the common second position.

In another embodiment, each of the plurality of motor controllers includes a microcontroller configured for controlling the associated reversible motor to move the lower end of the flexible shade material of the associated one of the plurality of roller shades from the first position to the common second position in response to the position information from the one of the plurality of optical assemblies.

In still another embodiment, each of the plurality of motor controllers is configured for controlling the associated reversible motor to move the lower end of the flexible shade material of the associated one of the plurality of roller shades from the first position to the second position using a proportional integral derivative (PID) loop.

In yet another embodiment, each of the plurality of motor controllers is configured for controlling the associated reversible motor to move the lower end of the flexible shade material of the associated one of the plurality of roller shades from the first position to the common second position using a variable linear velocity profile so that the lower end of the of the flexible shade material moves from the first position to the common second position at a variable linear velocity. The variable linear velocity profile includes one of an exponential function, a ramp function, or a Gaussian function.

In another embodiment, each of the plurality of motor controllers includes a controller interface including a communication port that employs at least one of a wired and wireless communication protocol. The communication protocol includes at least one of serial, I2C, USB, PS/2, Wi-Fi, Bluetooth, and infrared.

In still another embodiment, the master controller includes a plurality of master controller interfaces each including a communication port that employs at least one of a wired and wireless communication protocol. The communication protocol includes at least one of serial, I2C, USB, PS/2, Wi-Fi, Bluetooth, and infrared.

In yet another embodiment, the master controller includes a microcontroller configured for controlling the plurality of motor assemblies, the master controller includes a touchpanel, and the master controller includes a memory configured for storing the master shade movement time and position information for each of the plurality of roller shades.

According to another aspect, the invention involves a system for synchronizing movement of a plurality of roller shades each disposed at a first position to a common second position. Each of the plurality of roller shades includes a flexible shade material having a lower end and a rotatably supported roller tube windingly receiving the flexible shade material. The system includes a master controller, and a plurality of motor assemblies. Each of the plurality of motor assemblies is configured for receiving a master shade movement time from the master controller, and moving an associated one of the plurality of roller shades from the first position to the common second position using a variable linear velocity profile so that the associated one of the plurality of roller shades moves from the first position to the common second position at a variable linear velocity and arrives at the common second position simultaneously with the other of the plurality of roller shades in a time equal to the master shade movement time.

In one embodiment, the system further includes a plurality of optical assemblies each associated with one of the plurality of motor assemblies and each configured to obtain information related to the position of the associated one of the plurality of roller shades.

In another embodiment, each of the plurality of motor assemblies is configured for receiving the position information from the associated one of the plurality of optical assemblies.

In still another embodiment, each of the plurality of motor assemblies is configured for moving the associated one of the plurality of roller shades from the first position to the common second position simultaneously with the other of the plurality of roller shades in a time equal to the master shade movement time in response to the received position information.

In yet another embodiment, the master controller is further configured for retrieving a shade movement time from each of the plurality of motor assemblies and selecting the longest shade movement time as the master shade movement time.

In another embodiment, each of the plurality of motor assemblies is further configured for transmitting the position information to the master controller.

In still another embodiment, each of the plurality of optical assemblies includes an optical sensor configured for capturing an image frame of the flexible shade material of the associated one of the plurality of roller shades at a plurality of linear positions along the flexible shade material as the lower end of the flexible shade material moves between the first position and the common second position.

In yet another embodiment, each of the plurality of optical assemblies further includes a digital signal processor configured for processing the plurality of captured image frames of the flexible shade material of the associated one of the plurality of roller shades to determine changes in position of the flexible shade material as the lower end of the flexible shade material moves between the first position and the common second position.

In another embodiment, each of the plurality of optical assemblies further includes a light source configured for illuminating the flexible shade material of the associated one of the plurality of roller shades moving past the optical sensor. The light source includes one of an incandescent light, a light emitting diode, or a vertical cavity surface emitting laser.

In still another embodiment, the optical sensor includes one of a high speed digital camera, a charge coupled device, or a complementary metal oxide semiconductor detector.

In yet another embodiment, each of the plurality of motor assemblies includes a motor controller and an associated reversible motor configured for operably engaging the roller tube of the associated one of the plurality of roller shades to rotate the roller tube to move the lower end of the flexible shade material of the associated one of the plurality of roller shades between the first position and the common second position.

In another embodiment, each of the plurality of motor controllers includes a microcontroller configured for controlling the associated reversible motor to move the lower end of the flexible shade material of the associated one of the plurality of roller shades from the first position to the common second position in response to the position information from the one of the plurality of optical assemblies.

In still another embodiment, each of the plurality of motor controllers is configured for controlling the associated reversible motor to move the lower end of the flexible shade material of the associated one of the plurality of roller shades from the first position to the second position using a proportional integral derivative (PID) loop.

In yet another embodiment, the variable linear velocity profile includes one of an exponential function, a ramp function, or a Gaussian function.

In another embodiment, each of the plurality of motor controllers includes a controller interface including a communication port that employs at least one of a wired and wireless communication protocol. The communication protocol includes at least one of serial, I2C, USB, PS/2, Wi-Fi, Bluetooth, and infrared.

In still another embodiment, the master controller includes a plurality of master controller interfaces each including a communication port that employs at least one of a wired and wireless communication protocol. The communication protocol includes at least one of serial, I2C, USB, PS/2, Wi-Fi, Bluetooth, and infrared.

In yet another embodiment, the master controller includes a microcontroller configured for controlling the plurality of motor assemblies, the master controller includes a touchpanel, and the master controller includes a memory configured for storing the master shade movement time.

According to yet another aspect, the invention involves a system for synchronizing movement of a plurality of roller shades each disposed at a first position to a common second position. Each of the plurality of roller shades includes a flexible shade material having a lower end and a rotatably supported roller tube windingly receiving the flexible shade material. The system includes a master controller, a plurality of optical assemblies each configured to obtain information related to the position of an associated one of the plurality of roller shades, and a plurality of motor assemblies. Each of the plurality of motor assemblies is configured for receiving the position information from an associated one of the plurality of optical assemblies, receiving a master shade movement time from the master controller, and moving the associated one of the plurality of roller shades from the first position to the common second position using a variable linear velocity profile in response to the received position information so that the associated one of the plurality of roller shades moves from the first position to the common second position at a variable linear velocity and arrives at the common second position simultaneously with the other of the plurality of roller shades in a time equal to the master shade movement time.

In one embodiment, the master controller is further configured for retrieving a shade movement time from each of the plurality of motor assemblies and selecting the longest shade movement time as the master shade movement time.

In another embodiment, each of the plurality of motor assemblies is further configured for transmitting the position information to the master controller.

In still another embodiment, each of the plurality of optical assemblies includes an optical sensor configured for capturing an image frame of the flexible shade material of the associated one of the plurality of roller shades at a plurality of linear positions along the flexible shade material as the lower end of the flexible shade material moves between the first position and the common second position.

In yet another embodiment, each of the plurality of optical assemblies further includes a digital signal processor configured for processing the plurality of captured image frames of the flexible shade material of the associated one of the plurality of roller shades to determine changes in position of the flexible shade material as the lower end of the flexible shade material moves between the first position and the common second position.

In another embodiment, each of the plurality of optical assemblies further includes a light source configured for illuminating the flexible shade material of the one of the plurality of roller shades moving past the optical sensor. The light source includes one of an incandescent light, a light emitting diode, or a vertical cavity surface emitting laser.

In still another embodiment, the optical sensor includes one of a high speed digital camera, a charge coupled device, or a complementary metal oxide semiconductor detector.

In yet another embodiment, each of the plurality of motor assemblies includes a motor controller and an associated reversible motor configured for operably engaging the roller tube of the associated one of the plurality of roller shades to rotate the roller tube to move the lower end of the flexible shade material of the associated one of the plurality of roller shades between the first position and the common second position.

In another embodiment, each of the plurality of motor controllers includes a microcontroller configured for controlling the associated reversible motor to move the lower end of the flexible shade material of the one of the plurality of roller shades from the first position to the common second position in response to the position and movement information from the one of the plurality of optical assemblies.

In still another embodiment, each of the plurality of motor controllers is configured for controlling the associated reversible motor to move the lower end of the flexible shade material of the associated one of the plurality of roller shades from the first position to the second position using a proportional integral derivative (PID) loop.

In yet another embodiment, the variable linear velocity profile includes one of an exponential function, a ramp function, or a Gaussian function.

In another embodiment, the motor controller includes a controller interface including a communication port that employs at least one of a wired and wireless communication protocol. The communication protocol includes at least one of serial, I2C, USB, PS/2, Wi-Fi, Bluetooth, and infrared.

In still another embodiment, the master controller includes a plurality of master controller interfaces each including a communication port that employs at least one of a wired and wireless communication protocol. The communication protocol includes at least one of serial, I2C, USB, PS/2, Wi-Fi, Bluetooth, and infrared.

In yet another embodiment, the master controller includes a microcontroller configured for controlling the plurality of motor assemblies, the master controller includes a touchpanel, and the master controller includes a memory configured for storing the master shade movement time and position information for each of the plurality of roller shades.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

FIG. 1B is an illustrative perspective view of a roller shade and a sensor assembly, according to another embodiment of the invention.

FIG. 6 is an illustrative side view of a sensor assembly used for measuring the linear motion of a roller shade, according to still another embodiment of the invention.

FIGS. 8A-8F are illustrative front views the roller shade and sensor assembly of FIG. 2A mounted in a window frame, with the end portion of the roller shade disposed in various vertical positions between a fully open and a fully closed position.

LIST OF REFERENCE NUMBERS FOR THE MAJOR ELEMENTS IN THE DRAWING

Figure 1A:
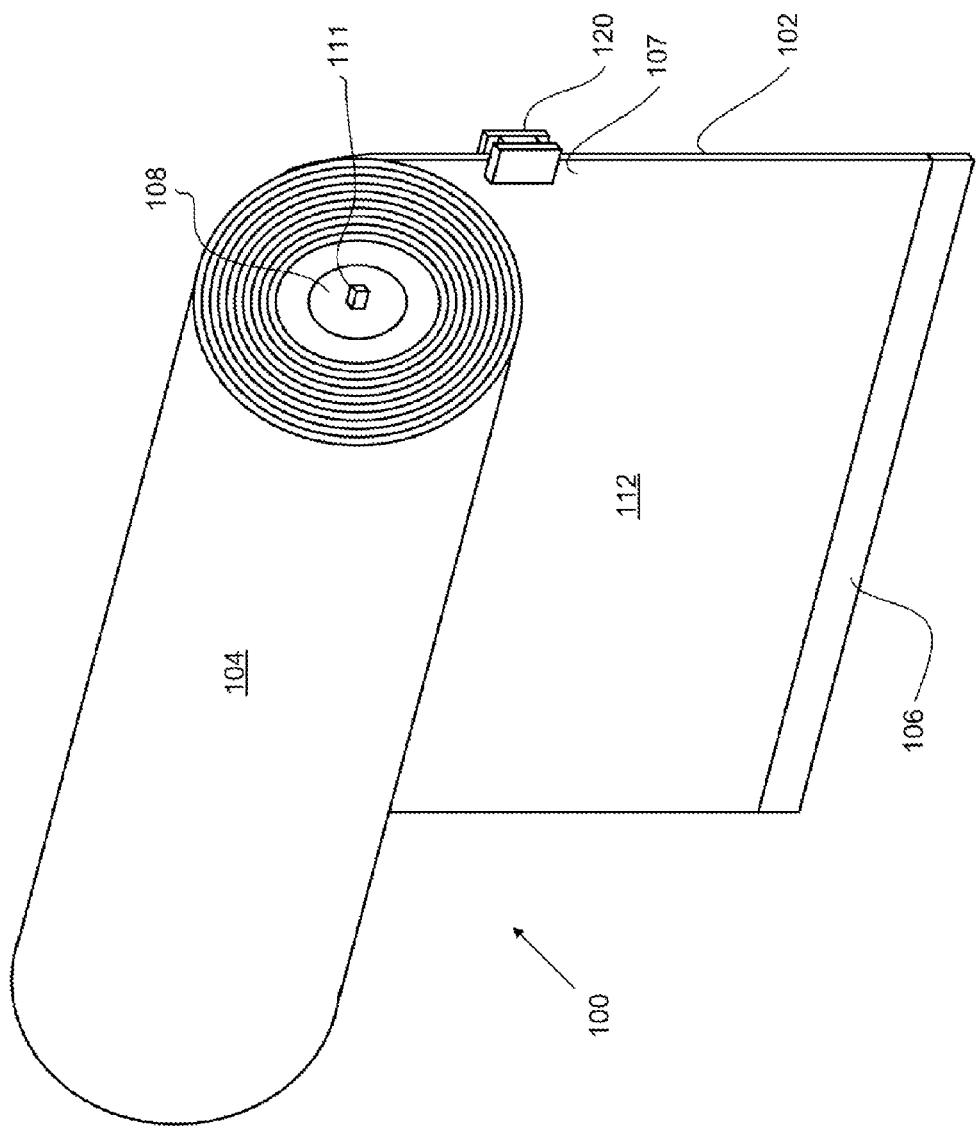
FIG. 1A is an illustrative perspective view of a roller shade and a sensor assembly, according to one embodiment of the invention.

The following is a list of the major elements in the drawings in numerical order.
100 roller shade
102 flexible shade material
104 rolled portion
106 lower end
107 upper end
108 roller tube
110 first pin
111 second pin
112 linear portion
120 sensor assembly
122 sensor assembly
202 motor assembly
204 socket
206 bracket
208 bracket
210 motor
212 motor controller
214 hinge/pivot pin
216 hinge/pivot pin
300 window
302 glass portion
304 frame
306 window box
308 right vertical side
310 mounting member
312 left vertical side
316 socket
402 sensor/DSP
404 lens
405 sensor interface
406 light source
410 first plate
412 third plate
414 second plate
416 roller assembly
420 lens opening
422 light source opening
424 housing
425 sensor interface opening
426 wheel
428 strut
430 wheel axle
432 channel
434 spring
502 plate
504 ball
506 lens opening
508 light source opening
510 housing
511 sensor interface opening
512 socket
600 sensor assembly
602 plate
604 lens opening
606 light source opening
608 reduced friction material layer
702 microcontroller
704 bridge driver circuit
706 memory
708 controller interface
802 window
902 unwind flexible shade material
904 record position of the lower end of the flexible shade material
906 wind flexible shade material
908 record position of the lower end of the flexible shade material
910 store length of shade material in memory
1002 input desired shade position
1004 retrieve distance/position and time information from memory
1006 start ramp-up algorithm, position PID loop, and time PID loop 1008 start moving shade according to ramp-up algorithm
1010 capture and process images of the moving flexible shade material to determine position information
1012 update PID loops with position information
1014 move shade according to position and time PID loops
1016 adjust linear velocity of the shade based on position information
1018 start reducing linear velocity of the shade in response to reaching a particular max linear velocity and position
1020 reduce linear velocity of the shade to zero as shade reaches the desired position
1102a microcontroller
1102b microcontroller
1104a bridge driver circuit
1104b bridge driver circuit
1106a memory
1106b memory
1108a controller interface
1108b controller interface
1110a motor
1110b motor
1112a motor controller
1112b motor controller
1120a sensor assembly
1120b sensor assembly
1130 master controller
1132 microcontroller
1134 memory
1136a master controller interface
1136b master controller interface
1138 touchpanel
1140a roller shade
1140b roller shade
1142a roller tube
1142b roller tube
1144a flexible shade material
1144b flexible shade material
1146a lower end
1146b lower end
1202 For each roller shade, store the length of the flexible shade material and vertical position
1204 Are the roller shades different lengths?
1206 Select the shade rise/lower time of the longest roller shade to be the master shade movement time
1208 The master shade movement time is the same as either shade rise/lower time
1210 User enters the desired position or selects a programmed preset position
1212 Transmit the desired position and master shade movement time to each shade microcontroller
1214 Move each roller shade according to the ramp-up algorithm, position PID loop, and time PID loop to the desired position in a time equal to the master shade movement time
1216 Store the new vertical shade position in memory
1302 first window frame
1304 second window frame

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves a system and a method for smoothly (i.e., non-abruptly) raising and lowering one or more roller shades to selected positions using variable linear shade velocities to prevent overshooting or undershooting the selected position.

The disclosed system includes an optical sensor assembly that is used to measure directly the motion of the roller shade (i.e., distance moved). Shade position information from the optical sensor assembly is communicated to a shade controller that moves the shade to a selected position using a variable linear shade velocity.

Figure 2A:
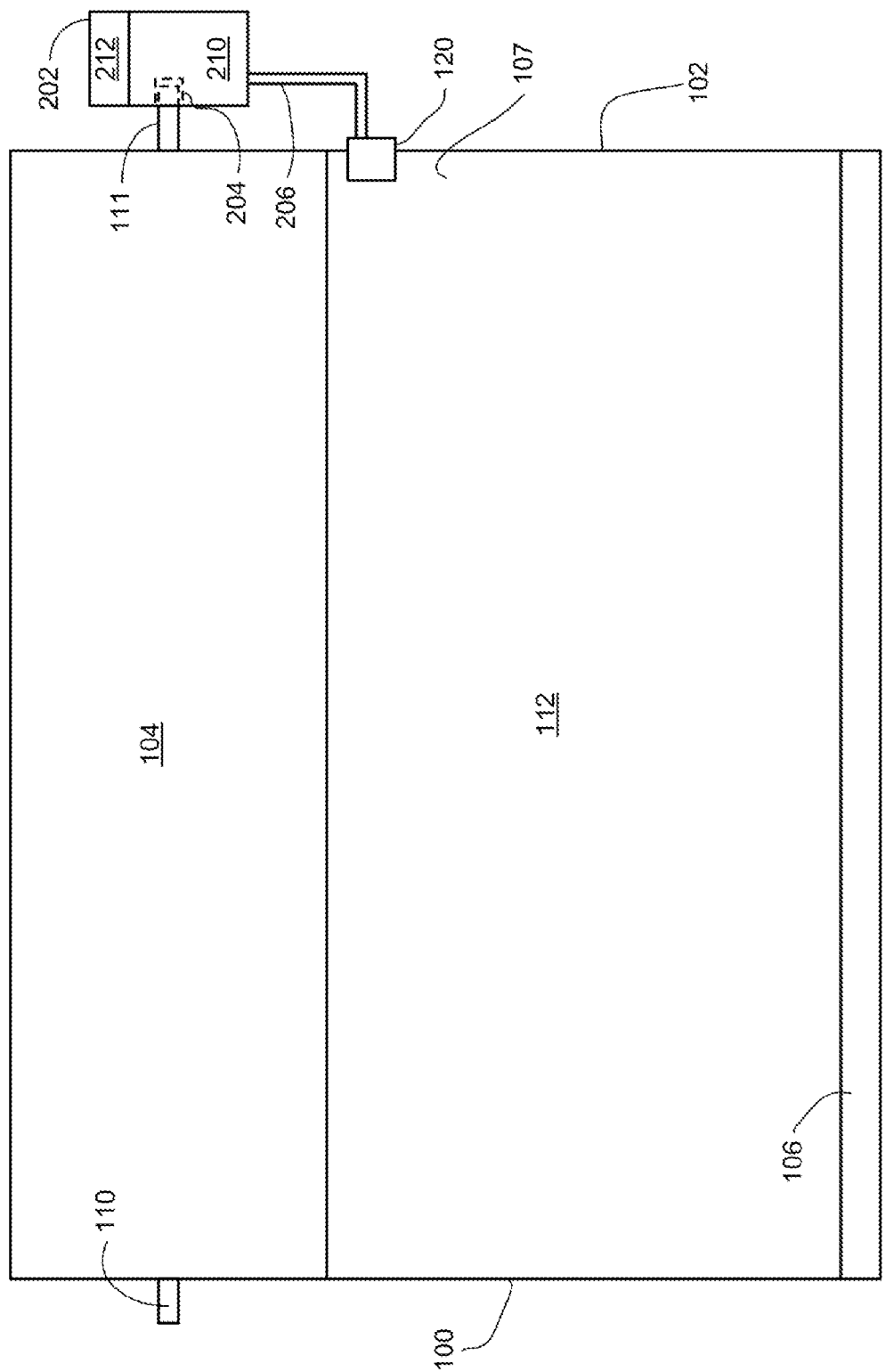
FIG. 2A is an illustrative front view of the roller shade and sensor assembly of FIG. 1A coupled to a motor assembly.

Referring to FIG. 1A and FIG. 2A, in one embodiment, illustrative perspective and front views of a roller shade system are shown. The roller shade system includes a roller shade 100, a sensor assembly 120, and a motor assembly 202.

The roller shade 100 includes a flexible shade material 102 and a roller tube 108. A rolled portion 104 of the flexible shade material 102 is wound around the roller tube 108. A linear portion 112 of the flexible shade material 102 hangs from the rolled portion 104 of the flexible shade material 102 and includes a lower end 106 and an upper end 107. The roller tube 108 includes a first pin 110 disposed on one end of the roller tube 108, and a second pin 111 disposed on the other end of the roller tube 108. The first pin 110 has a circular cross-section, and the second pin 111 has a non-circular cross-section. The cross-section of the second pin 111 may be square, rectangular, triangular, hexagonal, or octagonal, for example.

The motor assembly 202 includes a motor 210 and a motor controller 212. The motor 210 includes a socket 204 configured to engage the second pin 111 and, when activated, rotate the roller tube 108 to wind or unwind the flexible shade material 102.

As shown in FIGS. 1A and 2A, the sensor assembly 120 is disposed proximate to the linear portion 112 of flexible shade material 102. The sensor assembly 120 is held in place by a bracket 206 coupled to the motor assembly 202.

Figure 2B:
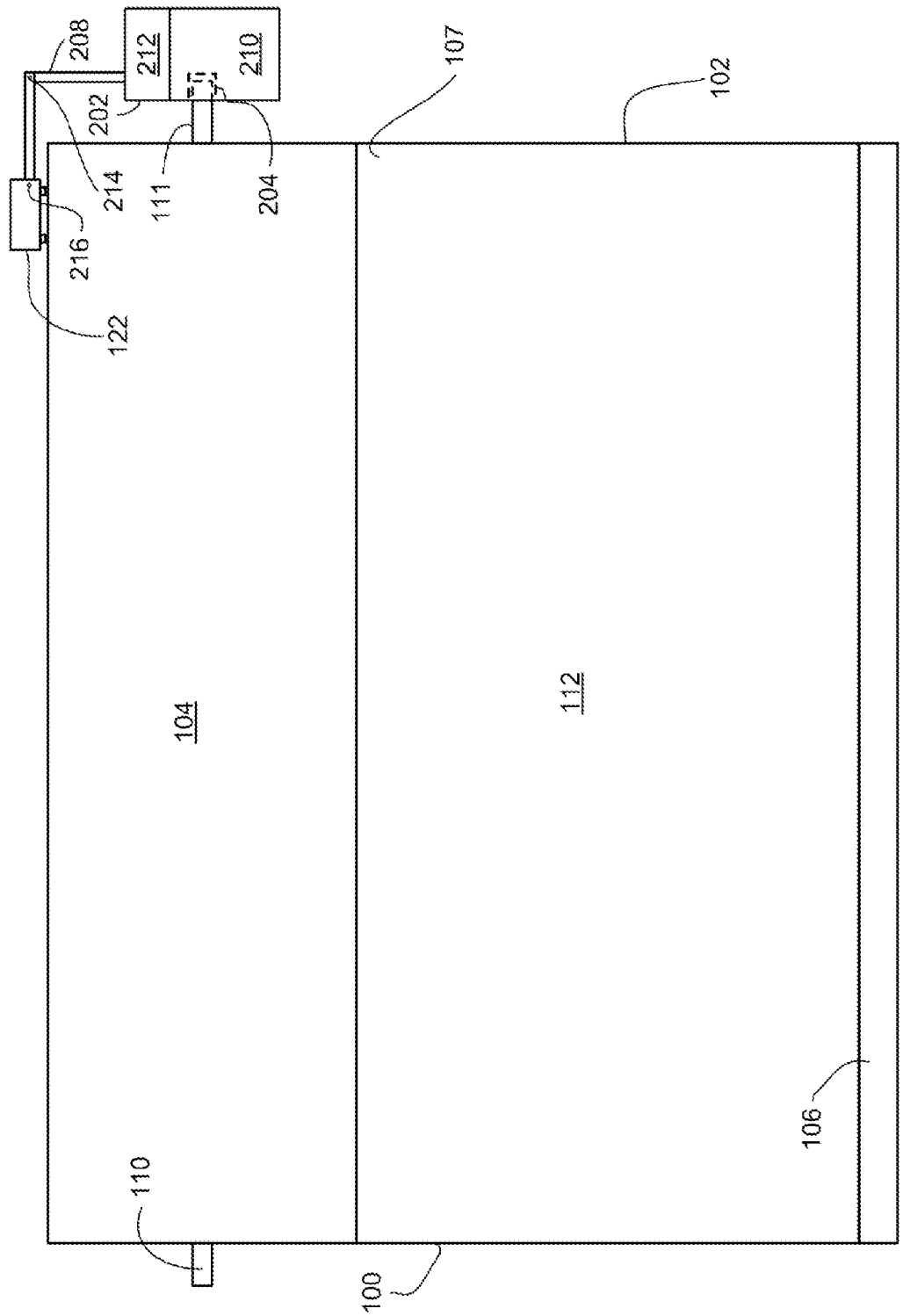
FIG. 2B is an illustrative front view of the roller shade and sensor assembly of FIG. 1B coupled to a motor assembly.

Referring to FIG. 1B and FIG. 2B, in another embodiment, the roller shade system includes a sensor assembly 122 in place of sensor assembly 120. The sensor assembly 122 is disposed proximate to the rolled portion 104 of the flexible shade material 102. The sensor assembly 122 is held in place by a bracket 208 coupled to the motor assembly 202, and held against the flexible shade material 102 by gravity.

The bracket 208 includes a hinge/pivot pin 214 and a hinge/pivot pin 216 (coupled to the sensor assembly 122). The bracket 208 and hinge/pivot pins 214, 216 enable the sensor assembly 122 to sit on the rolled portion 104 and lift or drop as the rolled portion 104 becomes thicker or thinner, as the flexible shade material 102 winds or unwinds from the roller tube 108.

Figure 3A:
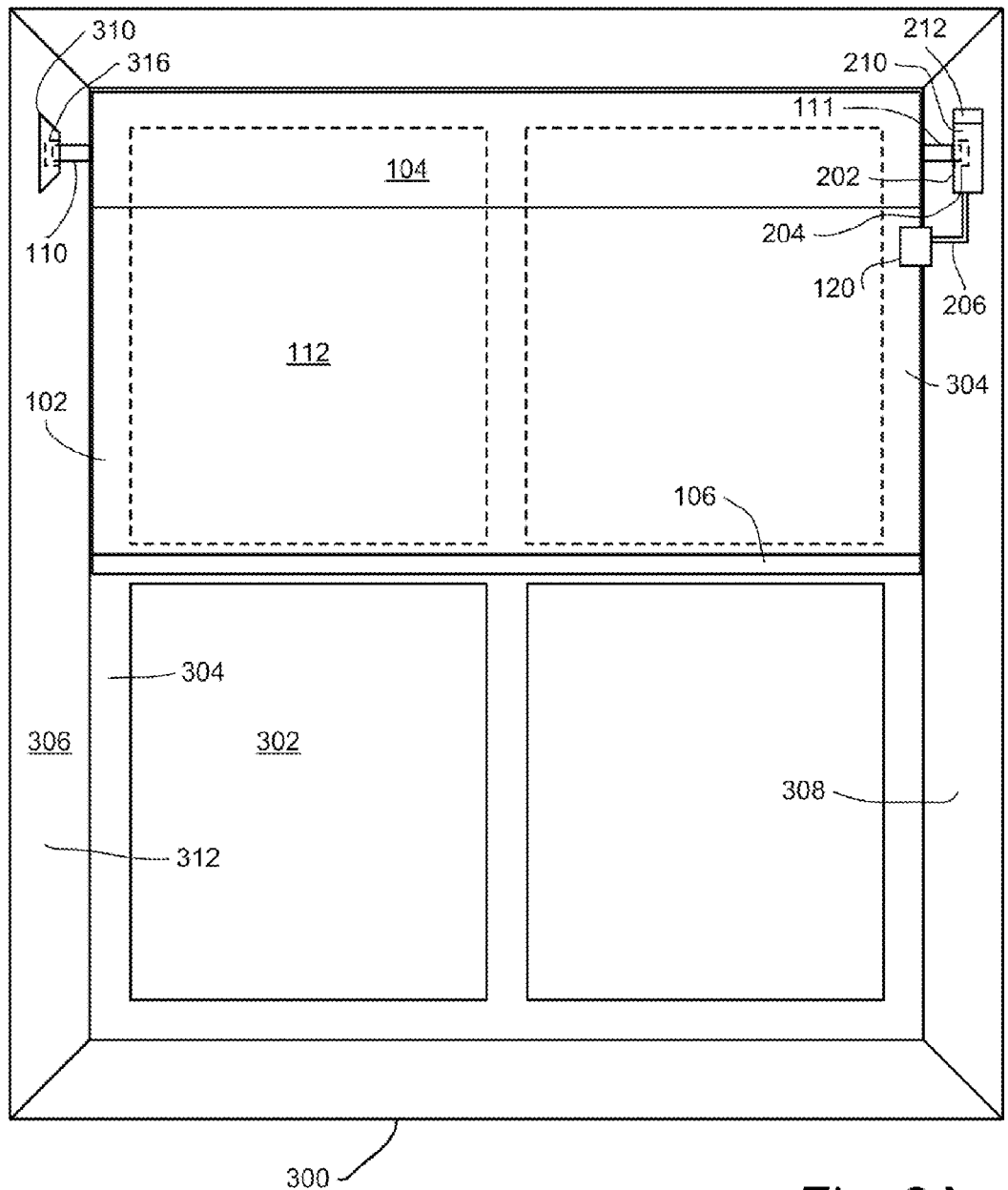
FIG. 3A is an illustrative front view the roller shade and sensor assembly of FIG. 2A mounted in a window frame, according to one embodiment of the invention.

Referring to FIG. 3A, in one embodiment, an illustrative diagram of a roller shade system mounted over a window 300 is shown. The window 300 includes a glass portion 302 held in a frame 304 that is disposed in a window box 306. The motor assembly 202 is mounted on a right vertical side 308 of the window box 306 and a mounting member 310 is mounted on a left vertical side 312 of the window box 306. The first pin 110 engages a socket 316 in the mounting member 310. The second pin 111 engages the socket 204 of the motor assembly 202. Thus, the roller tube 108 is supported by the motor assembly 202 and the mounting member 310, and may be rotated by the motor 210 to wind or unwind the flexible material 102. In this embodiment (as in FIG. 2A), the sensor assembly 120 is held in place by a bracket 206 coupled to the motor assembly 202.

In another embodiment, the sensor assembly 120 is held in place by a bracket coupled to a non-rotating portion of the roller tube 108. In yet another embodiment, the sensor assembly 120 is mounted to the window frame 304, to the right vertical side 308, or to the left vertical side 312 of the window box 306. In still another embodiment, the sensor assembly 120 is held in place by a bracket coupled to the mounting member 310.

Figure 3B:
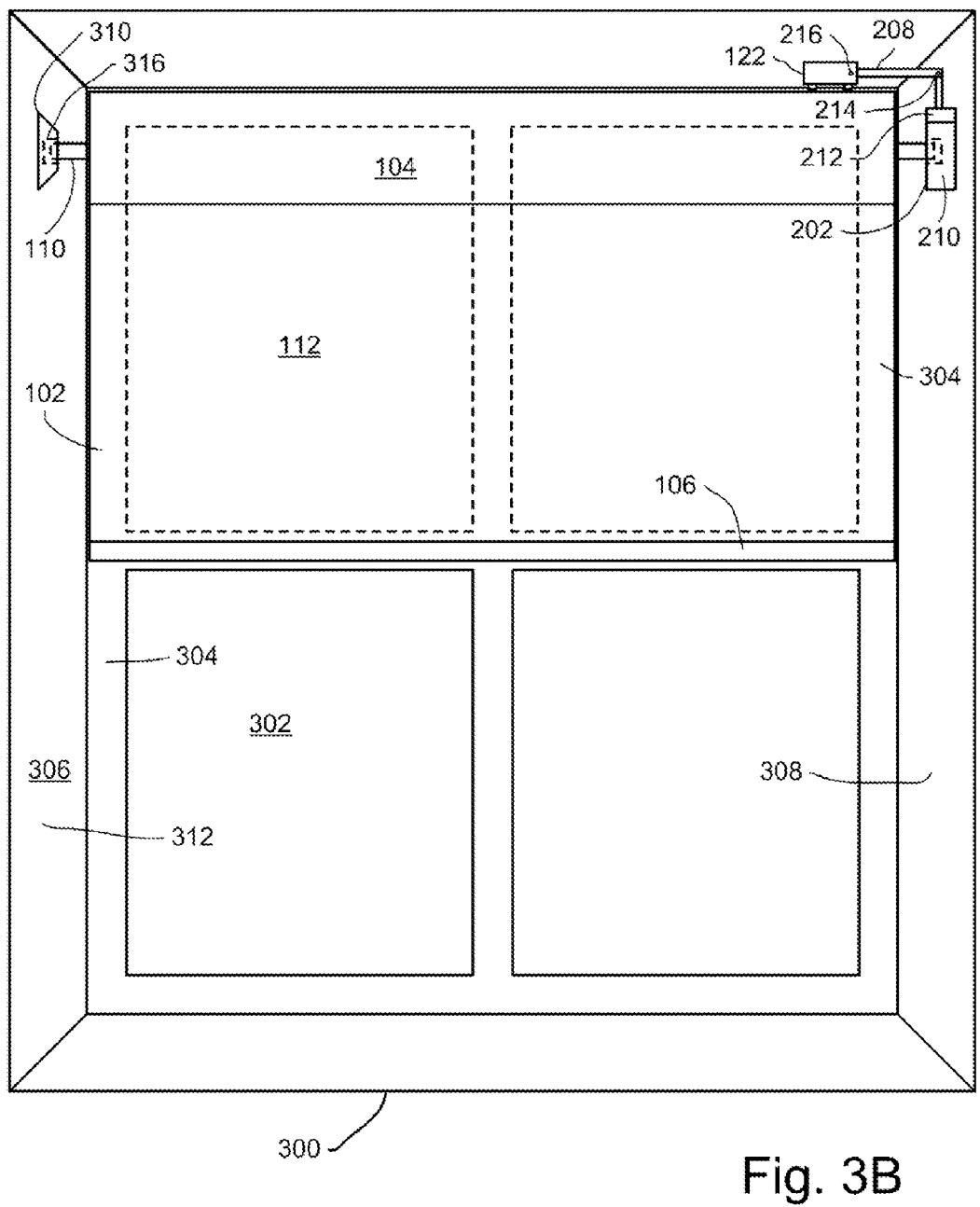
FIG. 3B is an illustrative front view the roller shade and sensor assembly of FIG. 2B mounted in a window frame, according to another embodiment of the invention.

Referring to FIG. 3B, in another embodiment (as in FIG. 2B), the sensor assembly 122 is held in place by a bracket 208 coupled to the motor assembly 202. In other embodiments, the sensor assembly 122 is held in place by a bracket coupled to a non-rotating portion of the roller tube 108, or to the mounting member 310. In still other embodiments, the sensor assembly 122 can be held against the rolled portion 104 anywhere along the circumference of the rolled portion 104 using a hinged/pivoting bracket tensioned with a spring.

Figure 4A:
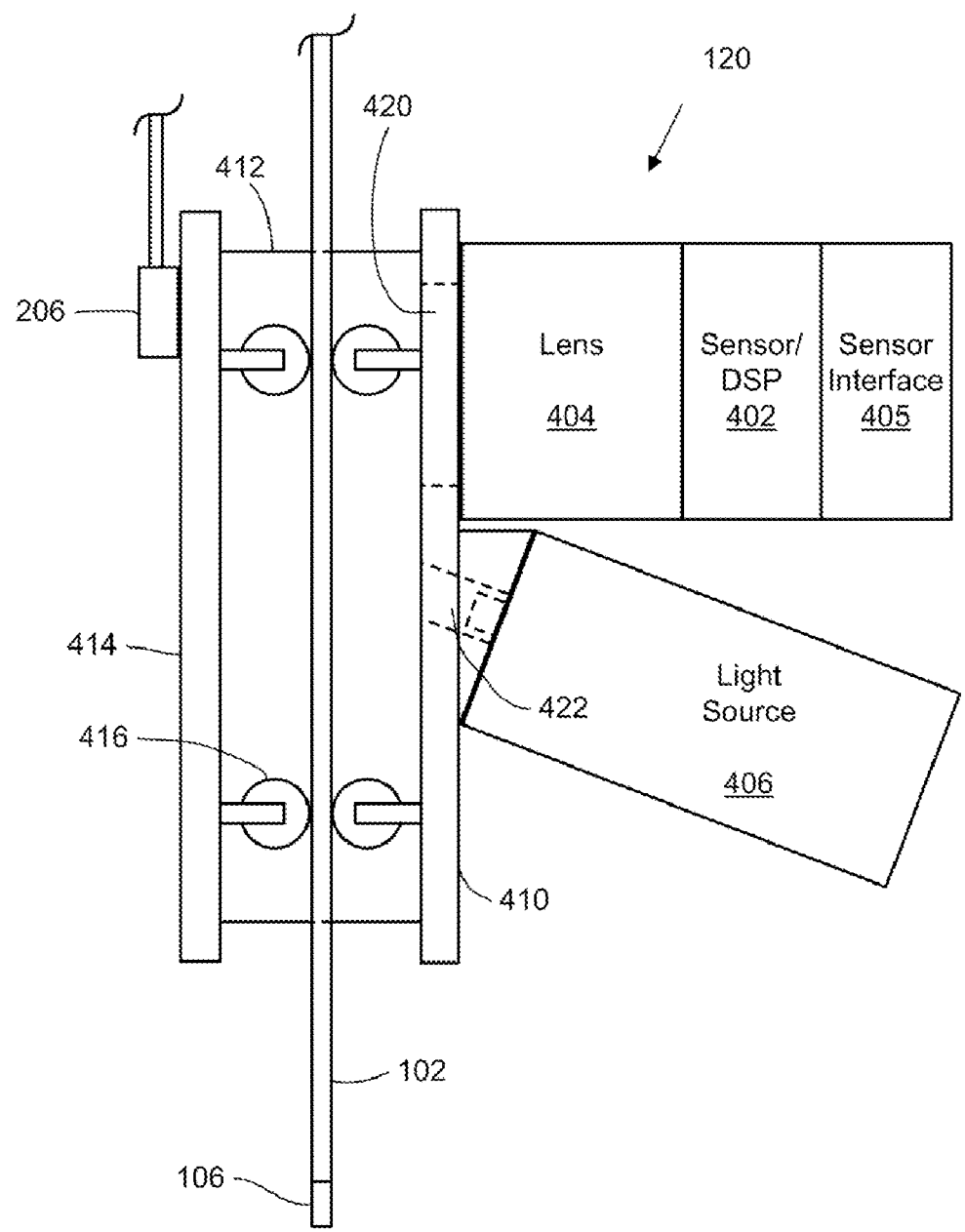
FIG. 4A is an illustrative side view of a sensor assembly used for measuring the linear motion of a roller shade, according to one embodiment of the invention.
Figure 4B:
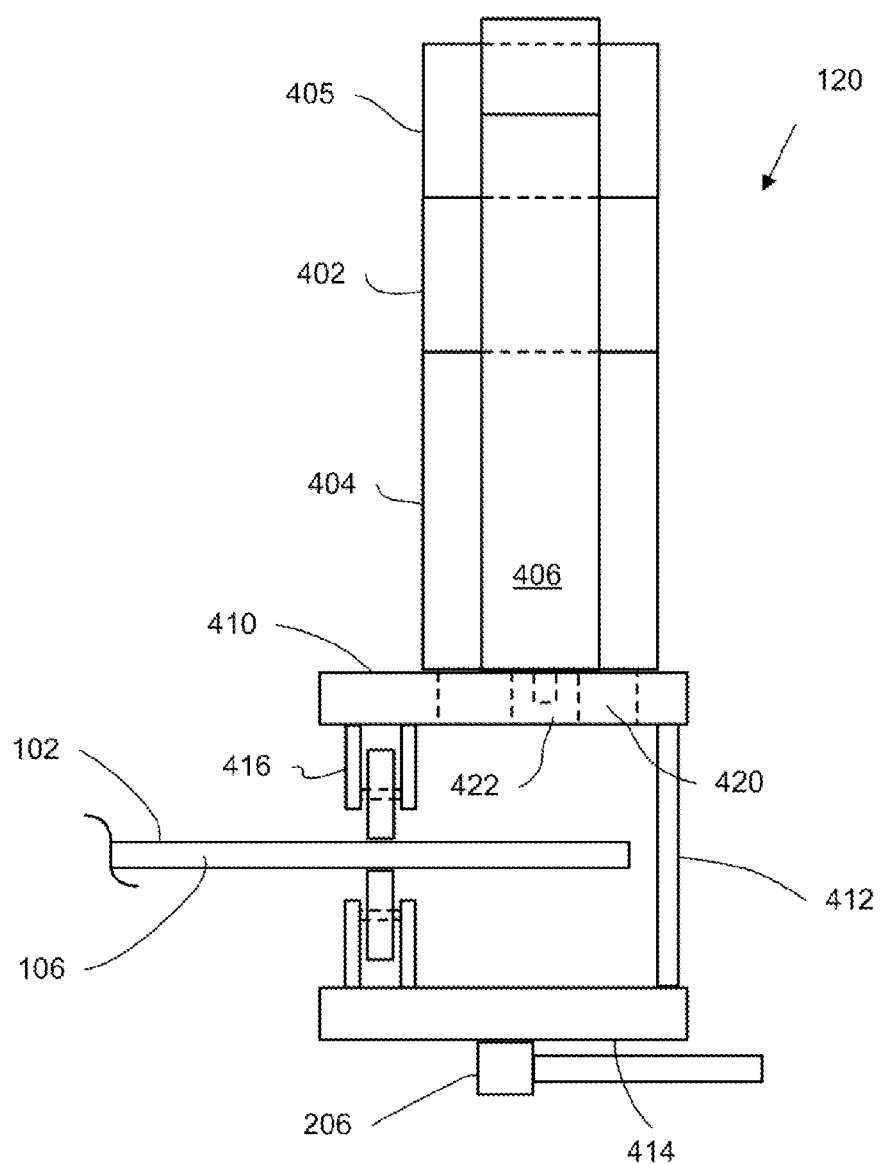
FIG. 4B is an illustrative bottom view of the sensor assembly of FIG. 4A.

Referring to FIGS. 4A and 4B, in one embodiment, illustrative side and bottom views of the sensor assembly 120 used for measuring the motion/position of the flexible shade material 102 are shown. The sensor assembly 120 includes a sensor unit 402. The sensor unit 402 includes an image acquisition section (i.e., the sensor itself), which captures image frames, and a digital signal processor (DSP), which interprets and processes the captured image frames and determines the motion (i.e., shade position displacement ($\Delta Y$)) of the flexible shade material 102. The sensor assembly 120 further includes a lens 404, which focuses the surface of the flexible shade material 102 on the sensor 402, a light source 406, which illuminates the surface of the flexible shade material 102, a sensor interface 405, a first plate 410, a second plate 414, and a third plate 412. The first plate 410, second plate 414, and third plate 412 are made of plastic, fiberglass, aluminum, or similar rigid material. The first plate 410 includes lens opening 420 and a light source opening 422. The sensor assembly 120 further includes a plurality of roller assemblies 416. The first plate 410 and the second plate 414 are both coupled to the third plate 412 and face each other.

Figure 4C:
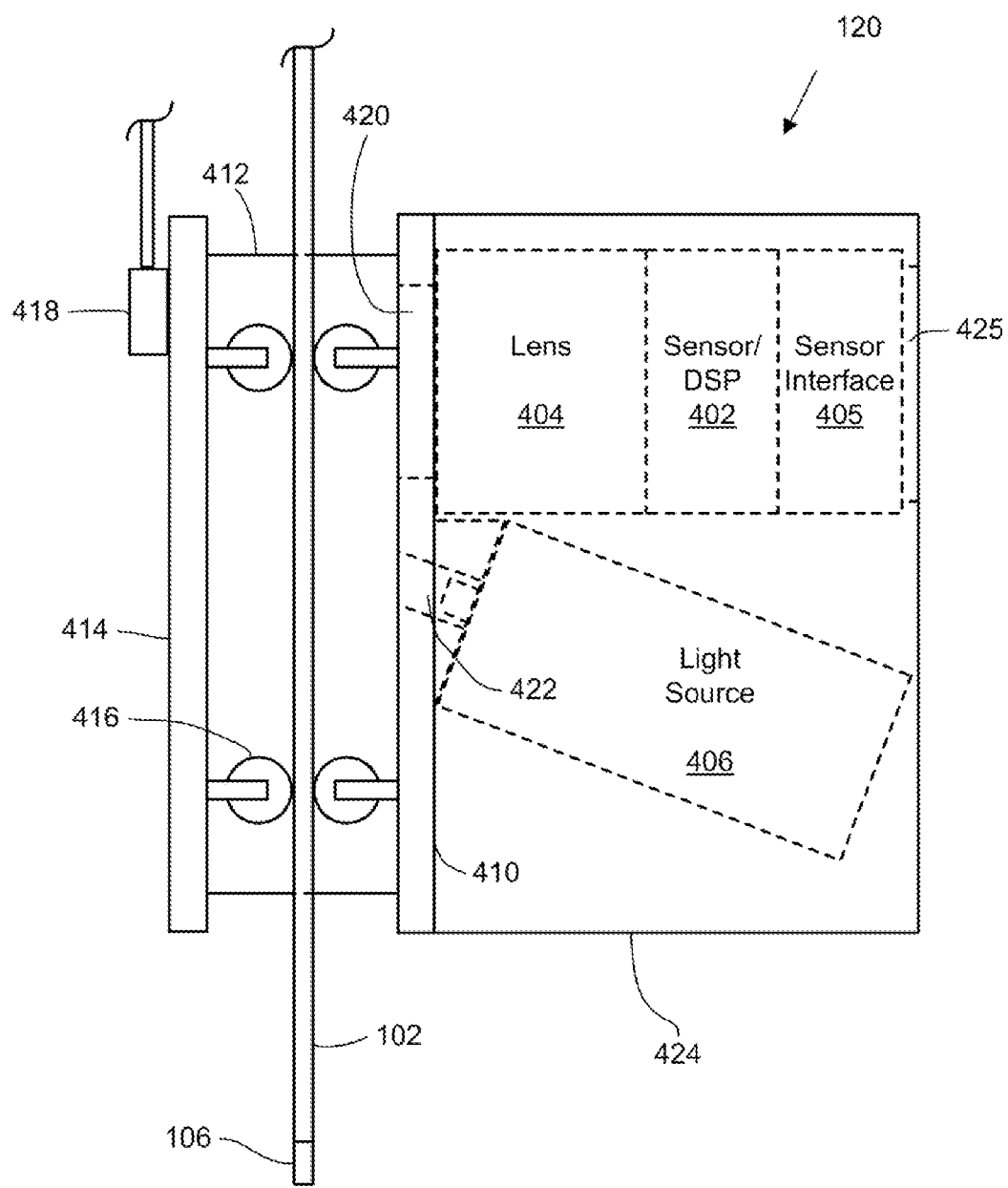
FIG. 4C is an illustrative side view of the sensor assembly of FIG. 4A including a housing, according to one embodiment of the invention.

Referring to FIG. 4C, the sensor assembly 120 also includes a cover or housing 424, which couples to the first plate 410 and covers/encloses the sensor/DSP 402, the lens 404, and the light source 406. The cover 424 is made of plastic, fiberglass, aluminum, or similar rigid material, and includes a sensor interface opening 425, which provides access to the sensor interface 405.

Figure 4D:
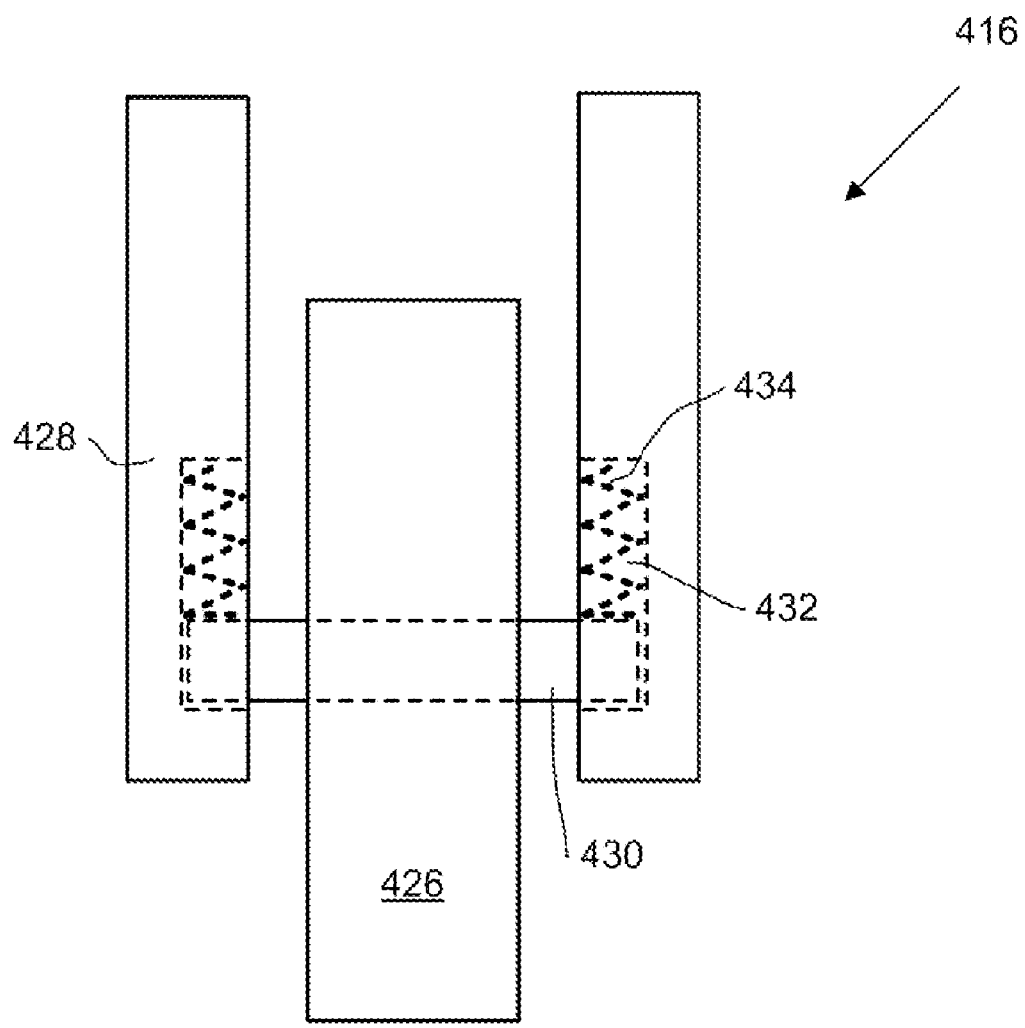
FIG. 4D is an illustrative front view of a roller assembly portion of the sensor assembly of FIG. 4A, according to one embodiment of the invention.

Referring to FIG. 4D, in one embodiment, the roller assembly 416 includes a wheel 426, a wheel axle 430, two struts 428, and two springs 434. The struts 428 each include a channel 432 in which an end of the axle 430 and a spring 434 are disposed. On or more roller assemblies 416 are coupled to the side of each of the first plate 410 and second plate 414 that face each other. Each of the plurality of roller assemblies 416 contacts a surface of the flexible shade material 102, and thereby allows the flexible shade material 102 to easily move/slide between the roller assemblies 416 (and plates 410, 414) at a constant distance from the light source 406 and the lens 404. The springs 434 in the channels 432 allow the wheel 426 to move to accommodate flexible shade materials of varying thickness. The roller assembly 416 is made of plastic, fiberglass, aluminum, or similar rigid material, or any combination thereof.

In various embodiments, a high speed digital camera functions as the sensor 402 and the lens 404, and one or more light emitting diodes or incandescent bulbs function as the light source 406. In preferred embodiments, the sensor 402 is a charged coupled device or a complementary metal oxide semiconductor (CMOS) detector (with a DSP in communication therewith), such as the ADNS-6010 sensor (with DSP) from Avago Technologies. Sensors of this type are capable of capturing frame images of any material that has a discernible pattern or texture. The lens 404 is the ADNS-6120 or ADNS-6130-001 from Avago Technologies. The light source 406 is a vertical cavity surface emitting laser (VCSEL), such as the ADNV-6340 laser diode also from Avago Technologies. In still another embodiment, the sensor 402 is an optical finger navigation sensor.

In operation, the flexible shade material 102 is first placed between the plurality of roller assemblies 416. In this position, the light source 406 illuminates the surface of the flexible shade material 102 that is currently disposed in front of the lens 404. The lens 404 focuses the portion of illuminated flexible shade material 102 onto the sensor 402. As the flexible shade material 102 is rolled or unrolled and thus passes in front of the sensor 402, a plurality of image frames are captured and passed to the DSP. From the plurality of image frames, the DSP determines the direction, i.e., up or down (+/− direction), and the distance $\Delta Y$ in an X-Y plane that the linear portion 112 of the flexible shade material 102 travels. $\Delta X$ should remain zero since the shade does not move left or right. The direction and distance information is passed from the sensor/DSP 402 to the controller 210 via the sensor interface 405. The sensor interface 405 is a communication port that employs one of a serial, I2C, USB, PS/2 communication protocol, or any other similar communication protocol known in the art.

The frame rate of the sensor 402 has to be faster than the standard 50 or 60 Hz frame rate used by televisions. Using such slow frame rates could cause the image detection algorithms to miss large transitions of the shade material and erroneously interpret a subsequent section of shade material as having the same image as a previous section of shade material. Consequently, the image detection algorithms would report false position information that would then cause the calculation of displacement, velocity, or direction to be in error.

To determine the frame rate required for the sensor 402, the density of the recognizable image details would have to be calculated, the field of view of the camera would have to be known, and the fastest linear velocity would have to be measured. The image in successive frames needs to show recognizable details that were present in previous image frames. Since it is not desirable to have to calculate these parameters for each type of shade material, it would be easier and more practical to capture images frames significantly faster than necessary. Capturing images frames faster than necessary would also greatly reduce the false detection of repeating patterns. Thus, in the preferred embodiment, the ADNS-6010 sensor (with DSP) from Avago Technologies, or similar sensor, which has a resolution 800-2000 counts per inch (CPI) is used.

Figure 5A:
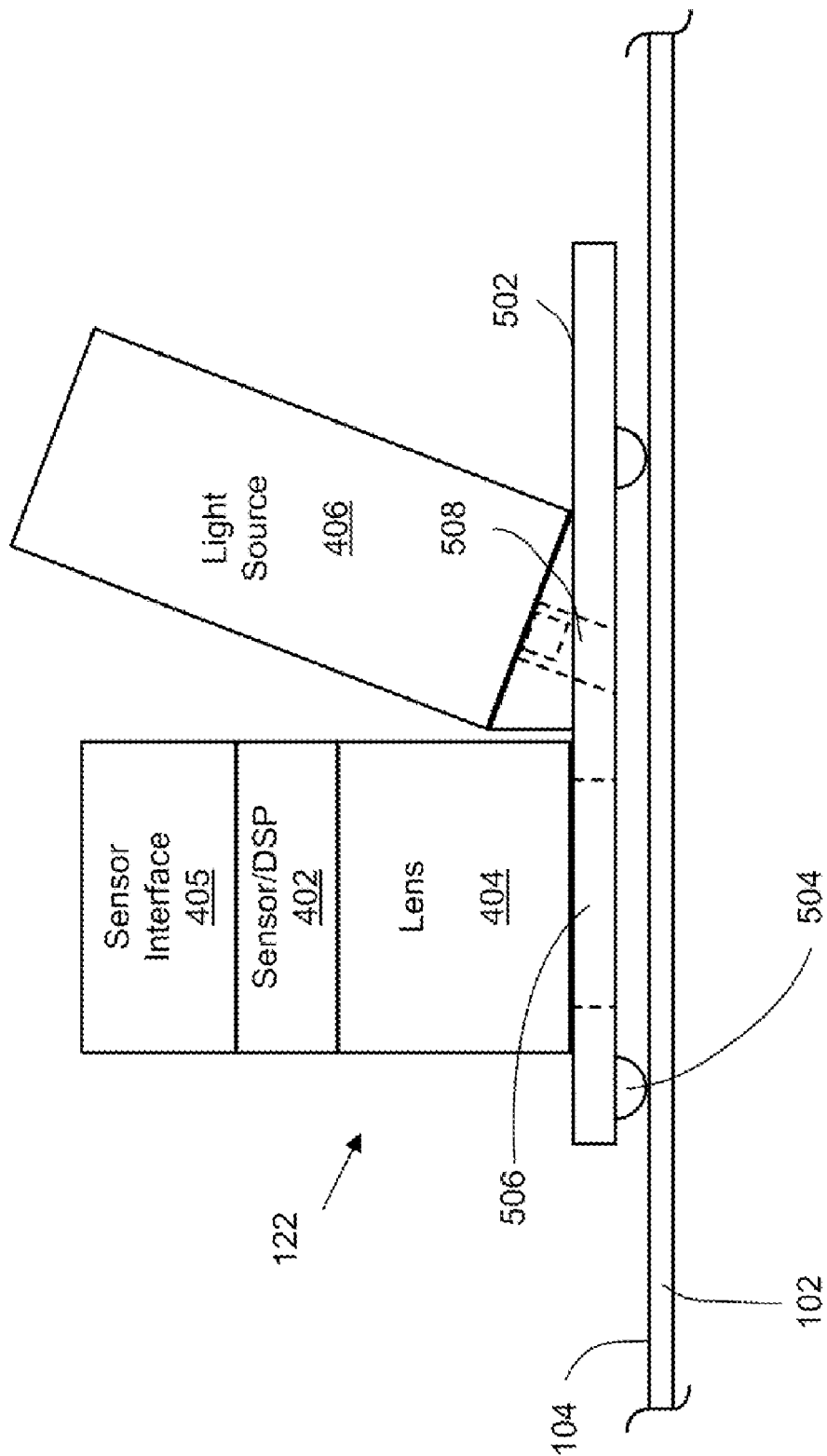
FIG. 5A is an illustrative side view of a sensor assembly used for measuring the linear motion of a roller shade, according to another embodiment of the invention.

Referring to FIG. 5A, in another embodiment, an illustrative side view of the sensor assembly 122 used for measuring the motion/position of the flexible shade material 102 is shown. The sensor assembly 122 includes a sensor 402, a lens 404, a light source 406, a sensor interface 405, and a plate 502. The plate 502 includes lens opening 506 and a light source opening 508. The sensor assembly 122 further includes a plurality of rollers 504. The rollers 504 can be wheels, cylinders, or balls (e.g., mouse ball). In this embodiment, the sensor assembly 122 is disposed on top of the rolled portion 104 of the flexible shade material 102, as shown in FIGS. 1B, 2B, and 3B.

Figure 5B:
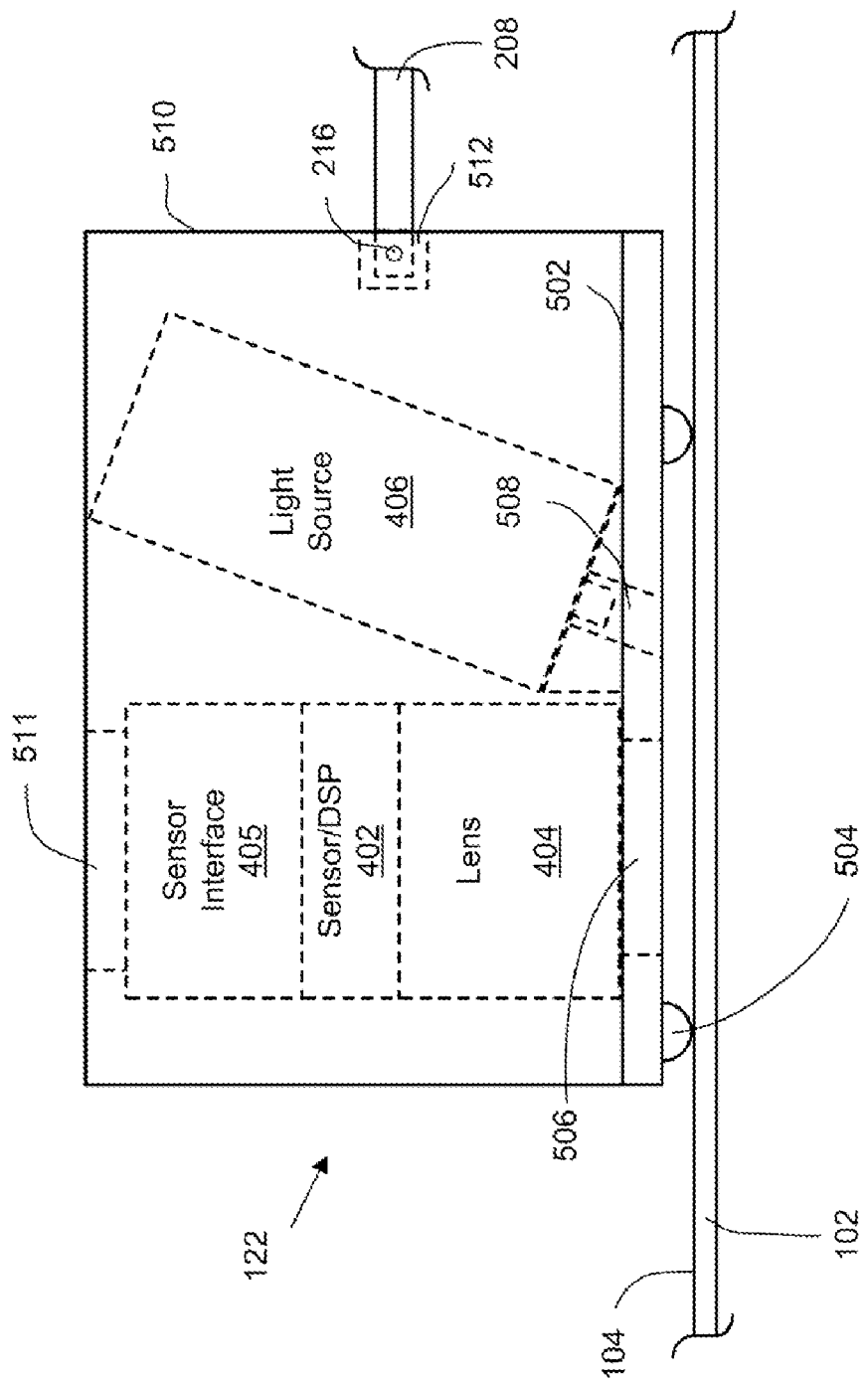
FIG. 5B an illustrative side view of the sensor assembly of FIG. 5A including a housing, according to another embodiment of the invention.

Referring to FIG. 5B, the sensor assembly 122 also includes a cover or housing 510, which couples to the plate 506 and covers/encloses the sensor 402, the lens 404, and the light source 406. The cover 510 includes a sensor interface opening 511, which provides access to the sensor interface 405. The cover 510 also includes a socket 512 in which an end of the bracket 208 and the hinge/pivot pin 216 are coupled.

In operation, the sensor assembly 122 is disposed on top of the rolled portion 104 of the flexible shade material 102 with the rollers 504 contacting the flexible shade material 102. The bracket 208 (FIG. 3B) prevents the sensor assembly 122 from moving in the horizontal plane, while the hinge/pivot pins 214 and 216 (FIG. 3B) allow the sensor assembly 122 to move up or down in the vertical plane as the rolled portion 104 increases or decreases in thickness as the shade 100 is opened (rolled) or closed (unrolled).

In this position, the top most portion of the rolled portion 104 of the flexible shade material 102 lies within the horizontal focal plane of the sensor 402 (i.e., the portion of the flexible shade material 102 lying within the horizontal plane tangent to the rolled portion 104). The portion of flexible shade material 102 in the horizontal focal plane and beneath the sensor 402 is illuminated by the light source 406. The lens 404 focuses this portion of illuminated flexible shade material 102 onto the sensor 402. As the flexible shade material 102 is rolled or unrolled and thus passes in beneath the sensor 402, a plurality of image frames are captured and passed to the DSP. From the plurality of image frames, the DSP determines the direction, i.e., winding-up or unwinding-down (+/− direction), and the distance ΔY in an X-Y plane that the linear portion 112 of the flexible shade material 102 travels. ΔX should remain zero since the shade does not move left or right. The direction and distance information is passed to the controller 210 via the sensor interface 405, as described above.

Referring to FIG. 6, in still another embodiment, sensor assembly 600 includes a plate 604 coated with a low friction material 608, such as polytetrafluoroethylene (PTFE), for example. The plate 604 (including the coating 608) includes a lens opening 604 and light source opening 606. In this embodiment, the low friction coating 608 replaces, and provides the same function as, the rollers 504, which is to allow the flexible shade material 102 to move beneath and past the sensor 402 and the light source 406.

In yet other embodiments, the camera or image sensor can be disposed at a fixed position proximate to the rolled portion 104 of the flexible shade material 102. In such an embodiment, the camera or image sensor would have a sufficient depth of focus to capture images over the varying distance between an unrolled shade to a fully rolled shade.

Figure 7:
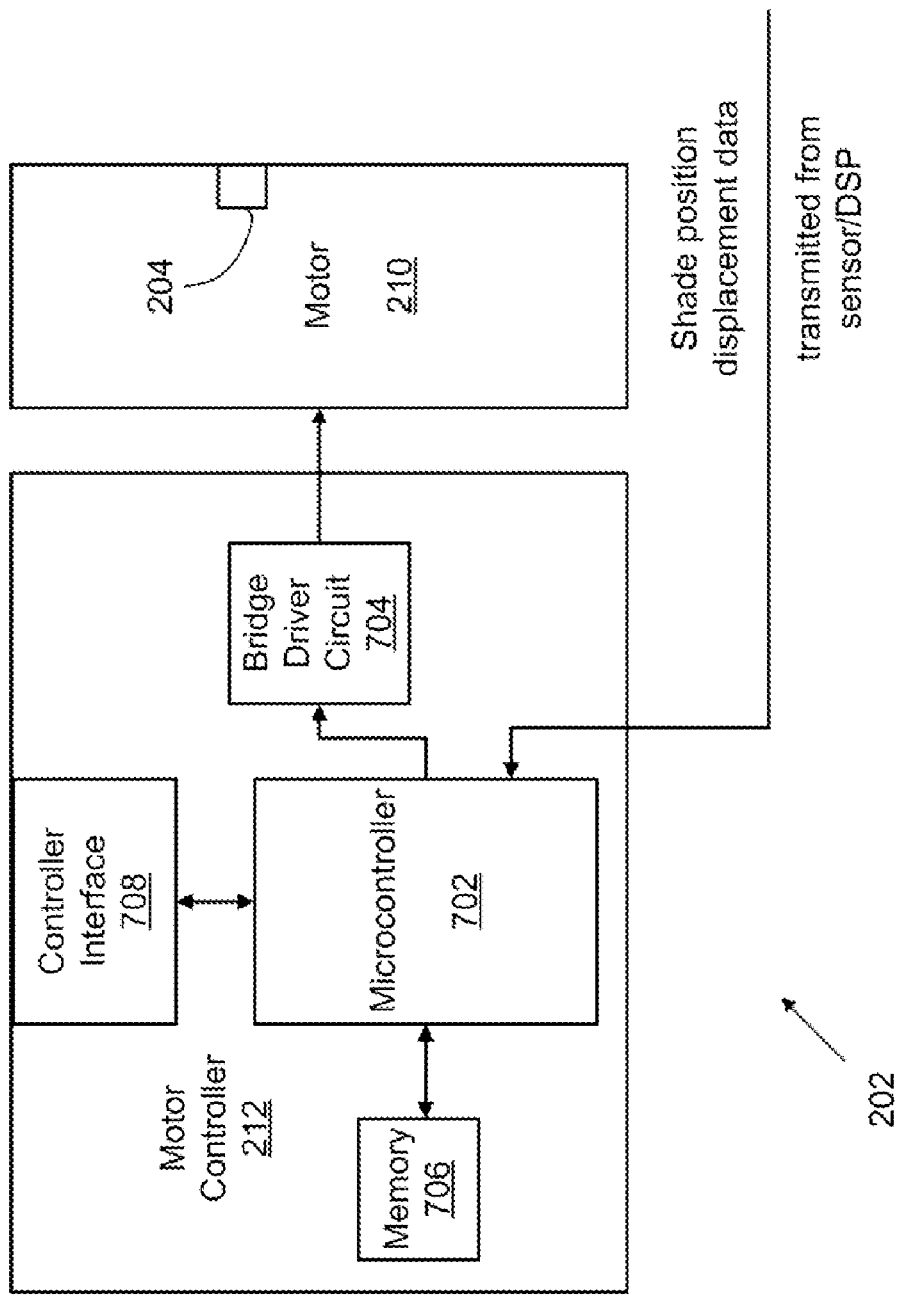
FIG. 7 is an illustrative block diagram of a motor assembly including a motor controller and a motor, according to one embodiment of the invention.

Referring to FIG. 7, in one embodiment, a block diagram of the motor assembly 202 is shown. The motor assembly 202 includes a motor controller 212 and motor 210. The motor controller 212 includes a microcontroller 702, a memory 706 in communication with the microcontroller 702, and a pulse width modulated (PWM) bridge driver circuit 704 in communication with the microcontroller 702. The PWM bridge driver circuit 704 is in communication with, and provides control voltages to, the motor 210. The microcontroller 702 is in communication with, and receives shade position displacement data (ΔY) from the sensor/DSP 402 via the sensor interface 405.

The motor controller 212 further includes a controller interface 708, which allows a user to externally control (e.g., via a touch screen), configure/program, and/or calibrate the motor controller 212 and the sensor assembly 120. The controller interface 708 also allows the motor controller 212 to be controlled by a master controller and synchronized with other shade controllers. In various embodiments, the controller interface 708 is a communication port that employs at least one of a wired (e.g., serial, I2C, USB, PS/2) and wireless (e.g., WiFi, Bluetooth, IR) communication protocol, or any other similar communication protocol known in the art.

In one embodiment, the memory 706 stores the useful length of the particular shade (i.e., the distance that the lower end 106 of the flexible shade material 102 moves when the shade moves from the fully open position to the fully closed position (or vice versa)). This length is obtained during calibration of the roller shade system, and is described below. The memory 706 also stores the current vertical position of the lower end 106 of the flexible shade material 102.

To move the shade to a desired position based on a user's input (or stored program/presets), the microcontroller 702 uses a control system algorithm, such as a critically damped proportional integral derivative (PID) position loop, to determine the instantaneous voltage applied to the motor 210 in order to rotate the roller tube 108 and thus wind or unwind the flexible shade material to move the lower end 106 of the shade to the desired position without overshooting or undershooting the desired position. Inputs to the PID loop include the stored shade length (or positions of the lower end 106 when the shade is fully open and fully closed, or current vertical position relative to a fully open or fully closed position), and the shade position displacement data (ΔY), which is received from the sensor/DSP 402 as the flexible shade material 102 is moved.

In other words, the disclosed shade controller only directly measures the linear distance that the shade has moved (i.e., ΔY), and in response thereto varies the voltage applied to the motor 210 in order to increase the speed of the motor 210 to have the linear velocity of the flexible shade material 102 first increase (from zero) based on the distance the shade is to be moved, and then slowly decrease the speed of the motor 210 until the linear velocity of the flexible shade material 102 finally equals zero at the desired position.

Since the diameter of the rolled portion 104 of the flexible shade material 102 varies as the flexible shade material 102 is wound or unwound, the rotational velocity and consequently the linear velocity (velocity of the linear portion 112) vary as the shade moves from the starting position to the desired position. The actual linear velocity of the flexible shade material 102 is calculated by differentiating the shade position displacement data (ΔY) received from the sensor/DSP 402 over time. Acceleration of the flexible shade material 102 is calculated by differentiating the calculated velocity over time.

In another embodiment, a secondary velocity PID loop is used to converge the actual instantaneous velocity to the desired instantaneous velocity. In still other embodiments, other control system algorithms that include calculations of position, velocity, and acceleration can be utilized to achieve similar performance.

In still another embodiment, the memory 706 also stores the desired maximum time allowed for moving the lower end 106 of the flexible shade material 102 between the shade being fully closed and the shade being fully open (or vice versa), i.e., the shade raise/lower time. For example, if the shade raise/lower time is thirty seconds, the shade must move from a fully closed position to a fully open position (or vice versa) within at most thirty seconds. In this embodiment, a separate time PID loop (executed by the microcontroller 702) is used to ensure that the shade moves from a start position to a desired position (which is achieved using the first (position) PID loop described above) within the shade raise/lower time. The actual time taken to move the shade from a start position to an end position (e.g., from 50 percent open to 75 percent open) depends on the actual distance the shade must move, but is never longer than the shade raise/lower time.

Using the position PID loop (or the position and time PID loops) alone to move the flexible shade material 102 from a starting position to a desired position may result in the shade being abruptly and rapidly accelerated from the starting position such that the motion of the shade appears "jerky" or jarring. In order to prevent such a jarring acceleration, in other embodiments, another algorithm is implemented in the microcontroller 702 to slowly increase (or ramp up) the linear velocity of the flexible shade material 102. Such algorithms include, but are not limited to, exponential functions, ramp functions, and Gaussian functions. This feature enables the shade to start moving with a slow, smooth, and non-jarring motion, and thus reduces noise and vibrations caused by the sudden acceleration of the motor 210 and the flexible shade material 102. Further, such a slow and smooth starting motion is more aesthetically pleasing than an abrupt jump to a constant linear shade velocity.

Referring to FIGS. 8A-8F, one embodiment of the roller shade system of the present invention disposed in a window 802 is shown. In particular, FIGS. 8A-8F show the lower end 106 of the linear portion 112 of the flexible shade material 102 at six different vertical positions, respectively.

Figure 8A:
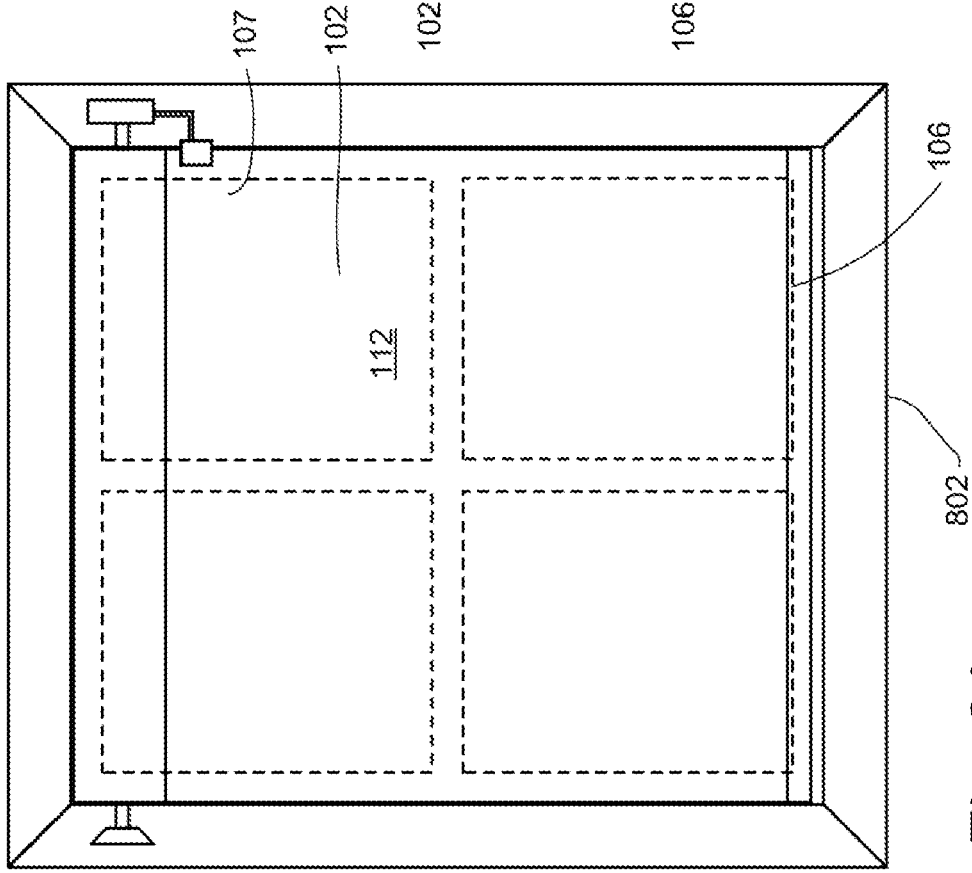
Figure 9:
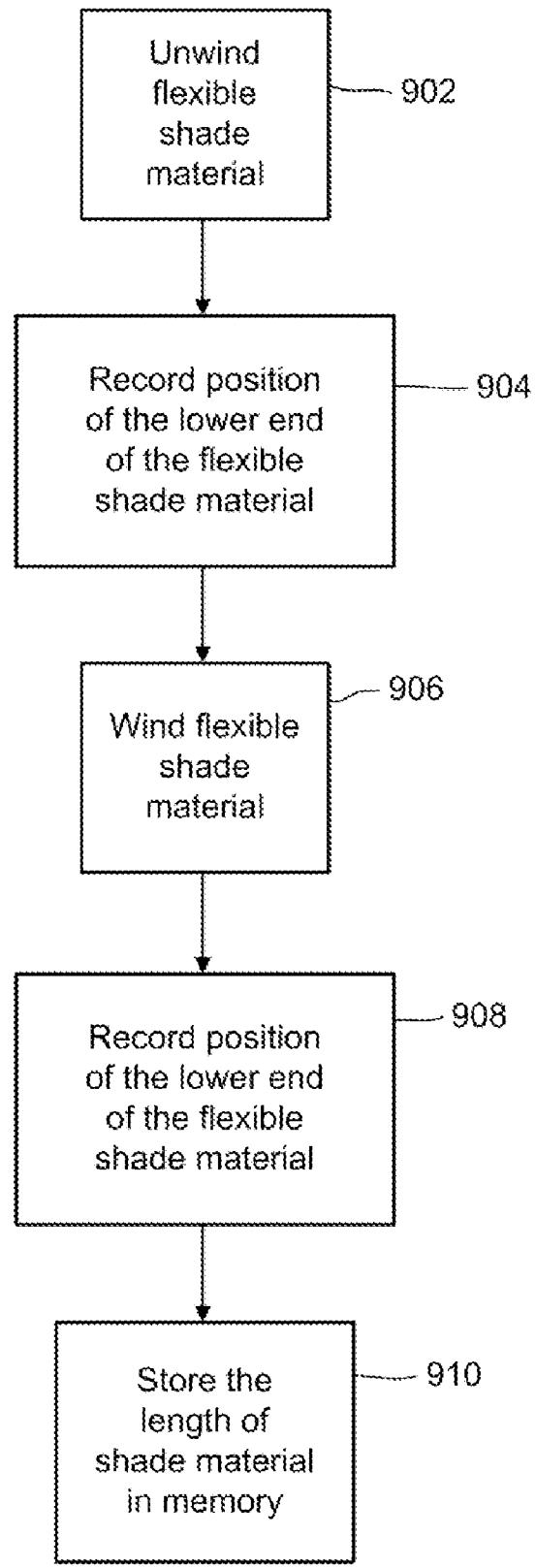
FIG. 9 is an illustrative flow diagram of the steps for calibrating the roller shade system, according to one embodiment of the invention.
Figure 10A:
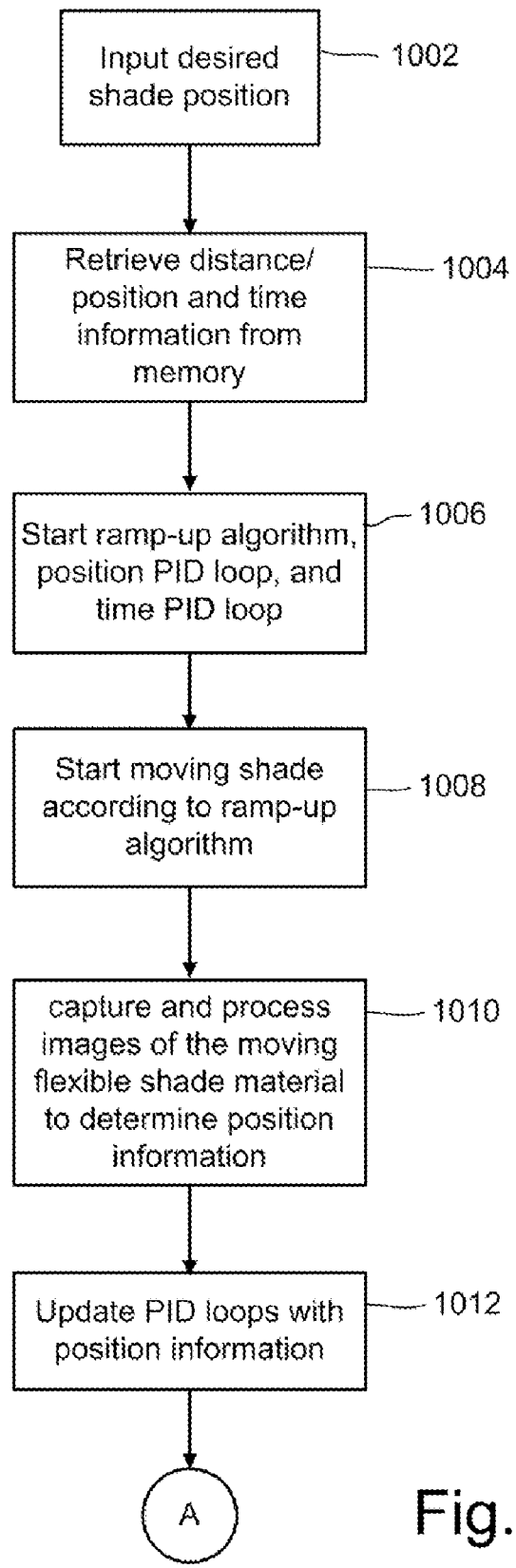
FIGS. 10A-10B are illustrative flow diagrams of the steps for moving the roller shade from a fully closed position to a fully open position, according to one embodiment of the invention.
Figure 10B:
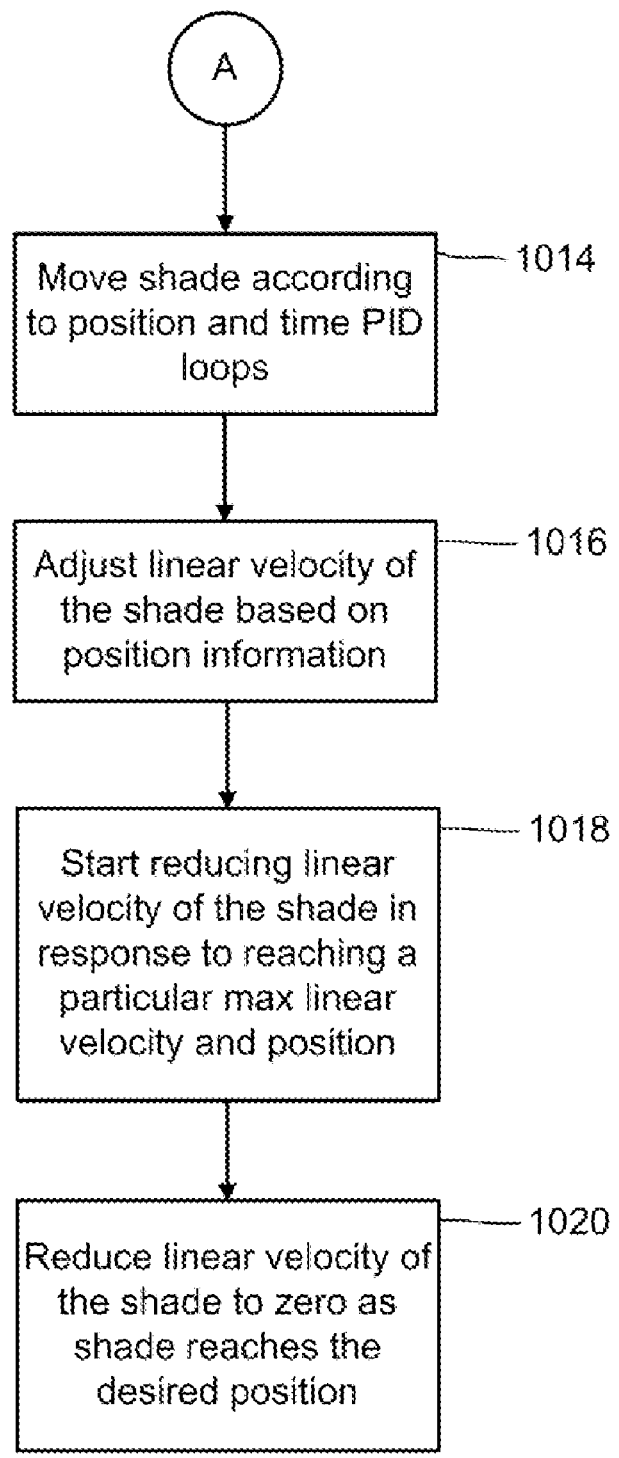

Referring to FIG. 9, in one embodiment, once the roller shade system has been installed/mounted in the window 802, the roller shade system must be calibrated. To calibrate the roller shade system, the flexible shade material 102 is unwound from the roller tube 108 so that the lower end 106 of the linear portion 112 of the flexible shade material 102 is positioned at the bottom of the window 802 (Step 902), as shown in FIG. 8A. This shade position (i.e., shade fully closed) is the starting position and recorded by the sensor 402 and processed by the DSP as position zero ("0,0" in an X-Y coordinate system) (Step 904).

Next, the flexible shade material 102 is wound onto the roller tube 108 so that the lower end 106 of the linear portion 112 of the flexible shade material 102 is positioned at the top of the window 802 (Step 906), as shown in FIG. 8F. This shade position is the ending position (shade fully open) and recorded by the sensor 402 and processed by the DSP as position L (Step 908) ("0,L" in an X-Y coordinate system), where L is length of the linear portion 112 of the flexible shade material 102 that covers the window 802. In other words, the length of flexible shade material 102 that moves past the sensor when the shade is moved from a fully closed position to a fully open position (or vice versa) is $\Delta Y=L$.

The value L is stored in the memory 706 of the motor controller 212 (Step 910). As mentioned above, in some embodiments, also stored in the memory 706 is the shade raise/lower time, which is the desired maximum time for raising the lower end 106 of the flexible shade material 102 from position zero (shade fully closed) to position L (shade fully open).

After the roller shade system has been calibrated, a user can then operate the system to move the shade to any desired position between and including fully open and fully closed.

To operate the disclosed shade system, a user need only input a desired shade position into a user interface, such as a touch screen, that is in communication (wired or wireless) with the motor controller 212. For example, the user can select "fully open", "fully closed", some percentage of fully open (e.g., 35 percent), or one of a plurality preset position settings (e.g., an exact position that blocks the sun at a particular time of day).

Figure 8B:
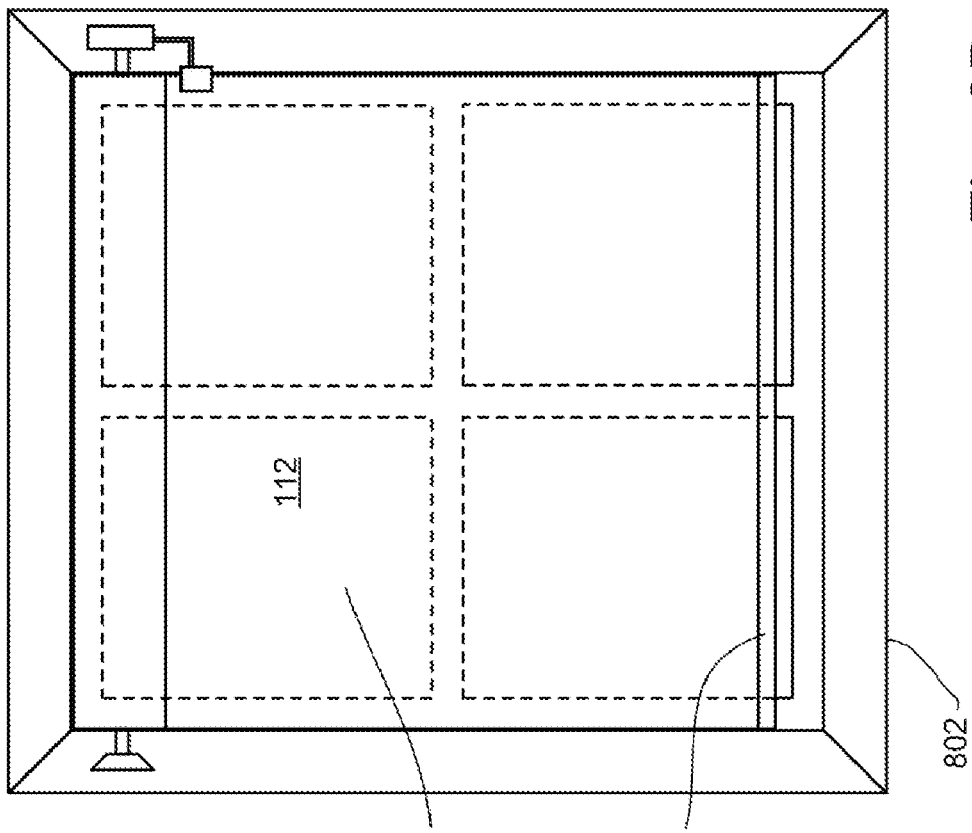

Referring to FIGS. 8A-8F and FIGS. 10A-10B, assume, for example, that the total length of the flexible shade material 102 that completely covers a window is forty inches long and that the maximum desired time to raise (or lower) the lower end 106 of flexible shade material 102 from the fully closed (or fully open) position is ten seconds. Next assume that the shade is fully closed (position zero), as shown in FIG. 8A, and that a user chooses to raise/move the shade to a fully open position (i.e., position L=40 inches), as shown in FIG. 8F. Additionally, since the roller shade system has been previously calibrated, the microcontroller 702 knows the current position of the lower end 106 of the flexible shade material 102 (i.e., fully closed, position zero (start position)).

After the user inputs the command to fully open the shade (Step 1002), the microcontroller 702 retrieves from memory 706 the distance to move the shade (e.g., 40 inches to the fully open position) and the maximum time to move the shade that distance (e.g., 10 seconds) (Step 1004). The microcontroller 702 then starts executing various control algorithms including the ramp-up algorithm to ensure the shade starts moving slowly and smoothly, the position PID loop to ensure that the linear shade velocity is zero at position L (i.e., the fully open position), and the time PID loop to ensure that the lower end 106 of the flexible shade material 102 moves to position L (40 inches) within ten seconds (Step 1006).

Referring the FIG. 8B, at the start of the shade motion, the microcontroller 702 uses the ramp-up algorithm to determine the particular voltage applied to the motor 210 so that the lower end 106 of the flexible shade material 102 starts moving (raising) slowly and gradually picks up speed, rather than abruptly jumping to some maximum speed (Step 1008). As the lower end 106 starts moving, the sensor/DSP 402 captures and processes images of the moving flexible shade material 102 (Step 1010) and reports this motion (position displacement $\Delta Y$) to the microcontroller 702, which, in turn updates the various PID loops (Step 1012).

Figure 8D:
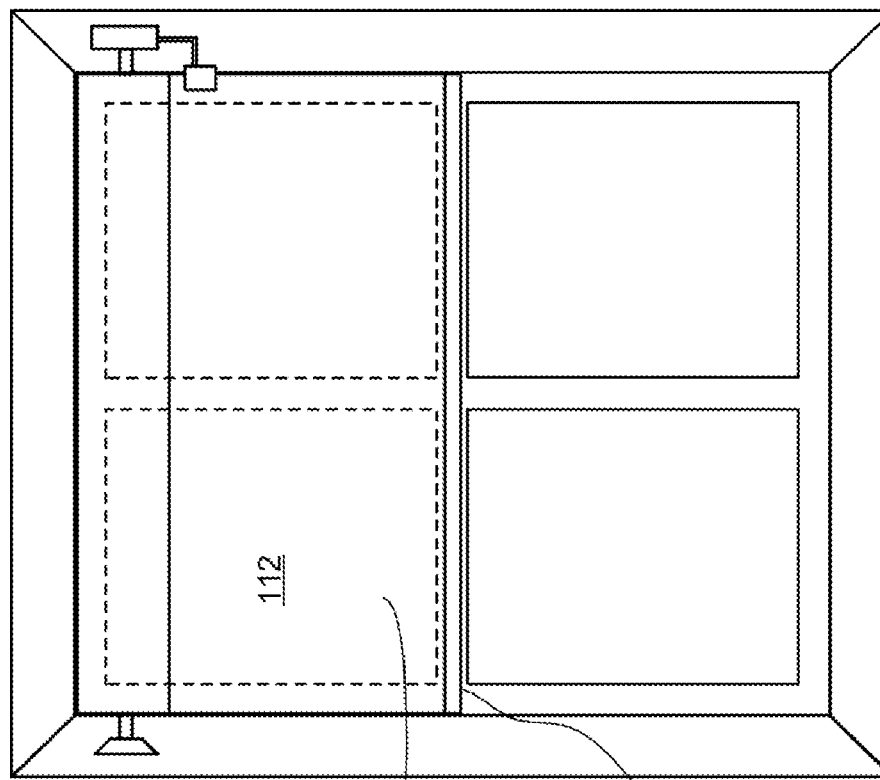
Figure 8C:
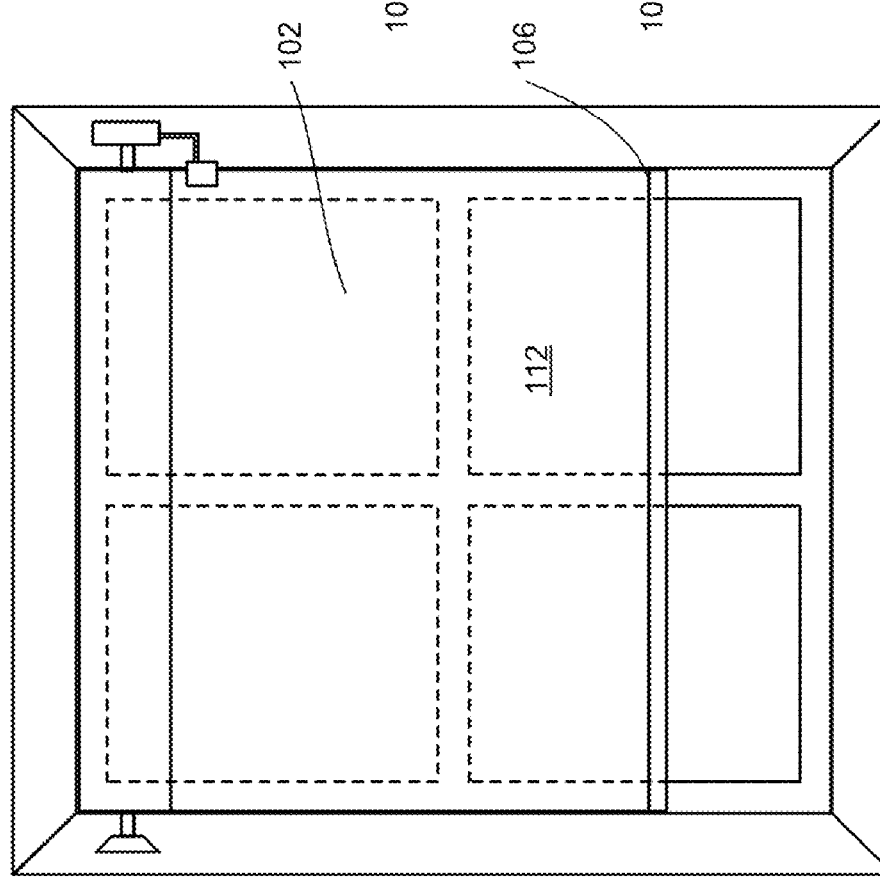

Referring to FIG. 8C, when the motor 210 reaches a particular speed and the lower end 106 reaches a particular position, the position and time PID loops take over from the ramp-up algorithm (Step 1014). The particular motor speed and vertical position of the lower end 106 at which the position and time PID loops take over from the ramp-up algorithm are determined by the position and time PID loops based on the final position to be reached and the time to reach that final position. The microcontroller 702 continuously makes corrections to the voltage applied to the motor 210 (and consequently to the rotational and linear velocities) based on the position information received from the sensor/DSP 402 in view of the final position to be reached and the time to reach that final position (Step 1016).

Referring to FIG. 8D, when the motor 210 reaches a particular speed and the lower end 106 reaches another particular position (e.g., half open), the position and time PID loops determine that the motor 210 (and lower end 106) needs to start slowing down in order for the lower end 106 to have a zero velocity at position L within the raise/lower time (Step 1018). As mentioned above, this process will prevent the lower end 106 from undershooting or overshooting the desired position L.

Referring to FIG. 8E, as the lower end 106 approaches the desired end position, the microcontroller 702 continues to adjust the voltage to the motor 210 (via position and time PID loops) to further slow down the speed of motor 210 and velocity of the lower end 106. Finally, as the lower end 106 reaches the position L, the motor speed and linear velocity of the lower end 106 reach zero (Step 1020), as shown in FIG. 8F. The new position (i.e., position L) of the lower end is then stored in the memory 706. This position is now the current shade position and consequently the start position relative to the next desired end position.

The above-described process would be the same for moving the shade from any start position to any desired end position. As described above, the last end position of the shade (i.e., after a previous move or after initial calibration) becomes the new start position relative to a new desired end position. After the user inputs the new shade end position, the shade starts moving under the control of a ramp-up algorithm. Then, after the motor 210 reaches a particular speed and the shade reaches a particular vertical position, the shade continues moving under control of a position PID loop and optionally also under control of a time PID loop until the shade reaches the next desired end position. For example, if the start position of the shade was 50% open and the desired end position of the shade was 75% open, the shade would move as described above between the 50% open position and the 75% open position.

Although it is intended that the sensor detect shade motion in one dimension in an X-Y plane, the optical sensors described herein are capable of detecting motion in two dimensions in an X-Y plane. In the event that the sensor is, or becomes, misaligned with the shade material motion in one dimension, such that motion of the shade material in both the X and Y planes is erroneously detected, Pythagorean's equation can be used to correct for the sensor misalignment and determine the actual motion of the shade.

Benefits of the disclosed optical shade controller system include being able to measure and control the motion of a roller shade without having to modify the shade material in any way. Further, because a dedicated light source is included in the sensor assembly, the shade can be controlled under any light conditions. Additionally, since the sensor is capable of capturing frame images of any material/fabric that has a discernible pattern or texture, any shade material with such a pattern or texture can be used.

In other embodiments, the sensor and motor assemblies described hereinabove are used to control and synchronize the movement of a plurality of roller shades. Specifically, a master controller is used to control and synchronize multiple motor assemblies (and associated roller shades) so that all of the roller shades in a particular room or area simultaneously move, and arrive at the same (i.e., common) final (selected) position at the same time regardless of each shade's starting position.

Figure 11A:
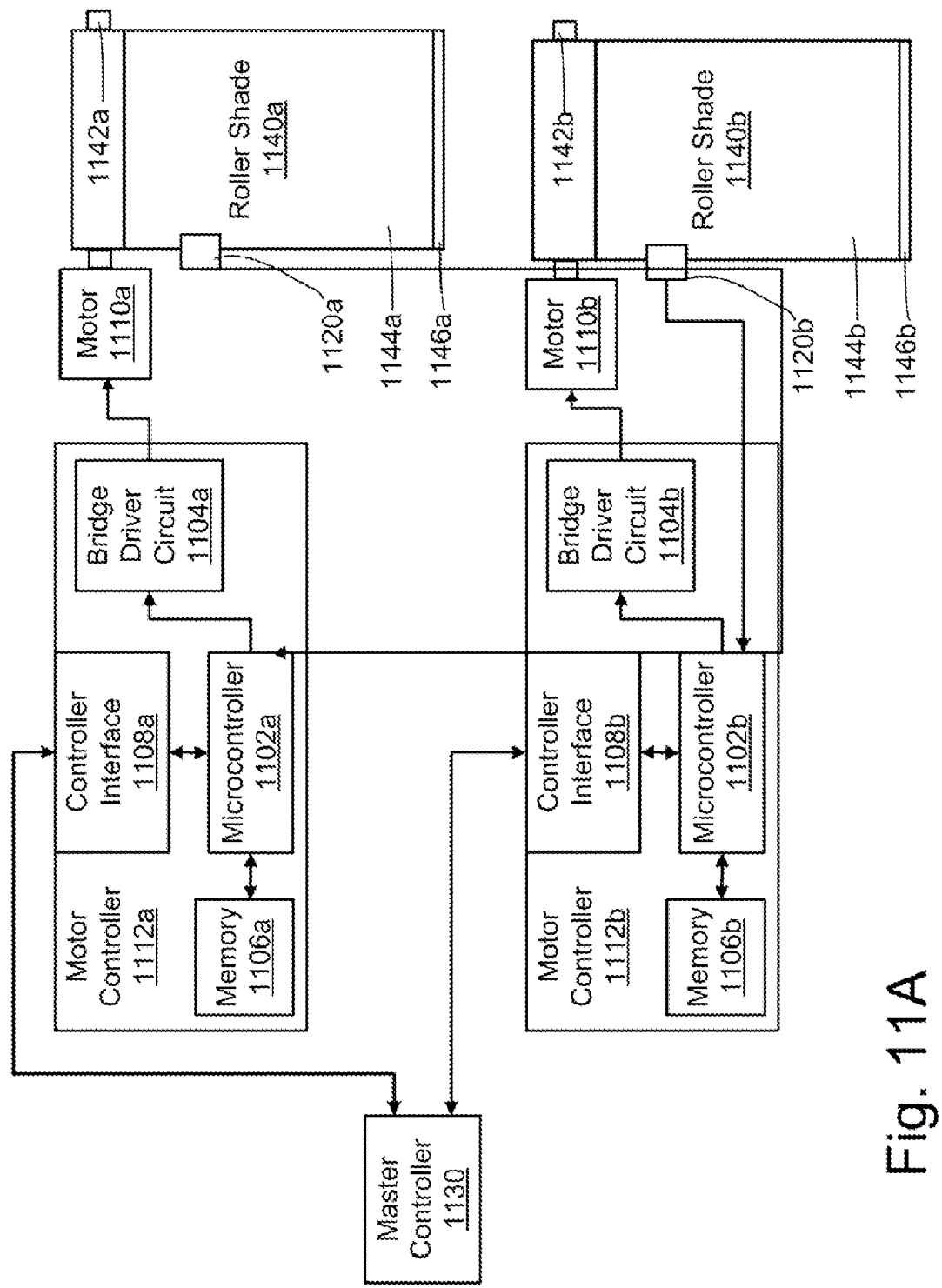
FIG. 11A is an illustrative block diagram of a plurality of sensor and motor assemblies and a master controller, according to one embodiment of the invention.

Referring to FIG. 11A, in one embodiment, a block diagram of two sensor assemblies 1120a, 1120b, two motor controllers 1112a, 1112b, two motors 1110a, 1110b, two roller shades 1140a, 1140b, and a master controller 1130 for controlling the two roller shades 1140a, 1140b is shown. In other embodiments, more sensor assemblies, motor controllers, and motors are connected to, and controlled by, the master controller 1130. In various embodiments the two sensor assemblies 1120a, 1120b, the two motor controllers 1112a, 1112b, two motors 1110a, 1110b, and the master controller 1130 are powered using alternating current (AC) and/or direct current (DC) methods known to those skilled in the art.

Similar to that described above with respect to FIG. 7, the motor controller 1112a includes a microcontroller 1102a, a memory 1106a in communication with the microcontroller 1102a, and a pulse width modulated (PWM) bridge driver circuit 1104a in communication with the microcontroller 1102a. The PWM bridge driver circuit 1104a is in communication with, and provides control voltages to, the motor 1110a. The motor 1110a rotates a roller tube 1142a of the roller shade 1140a to wind or unwind flexible shade material 1144a. The microcontroller 1102a is in communication with, and receives shade position displacement data ($\Delta Y$) from a sensor/DSP of the sensor assembly 1120a via a sensor interface. The motor controller 1112a further includes a controller interface 1108a, which enables the motor controller 1112a to be controlled by the master controller 1130. In various embodiments, the controller interface 1108a is a communication port that employs at least one of a wired (e.g., serial, I2C, USB, PS/2) and wireless (e.g., WiFi, Bluetooth, IR) communication protocol, or any other similar communication protocol known in the art. The sensor assembly 1120a and the motor controller 1112a function as previously described above.

Likewise, the motor controller 1112b includes a microcontroller 1102b, a memory 1106b in communication with the microcontroller 1102b, and a pulse width modulated (PWM) bridge driver circuit 1104b in communication with the microcontroller 1102b. The PWM bridge driver circuit 1104b is in communication with, and provides control voltages to, the motor 1110b. The motor 1110b rotates a roller tube 1142b of the roller shade 1140b to wind or unwind flexible shade material 1144b. The microcontroller 1102b is in communication with, and receives shade position displacement data ($\Delta Y$) from a sensor/DSP of the sensor assembly 1120b via a sensor interface. The motor controller 1112b further includes a controller interface 1108b, which enables the motor controller 1112b to be controlled by the master controller 1130. In various embodiments, the controller interface 1108b is a communication port that employs at least one of a wired (e.g., serial, I2C, USB, PS/2) and wireless (e.g., WiFi, Bluetooth, IR) communication protocol, or any other similar communication protocol known in the art. The sensor assembly 1120b and the motor controller 1112b function as previously described above.

Figure 11B:
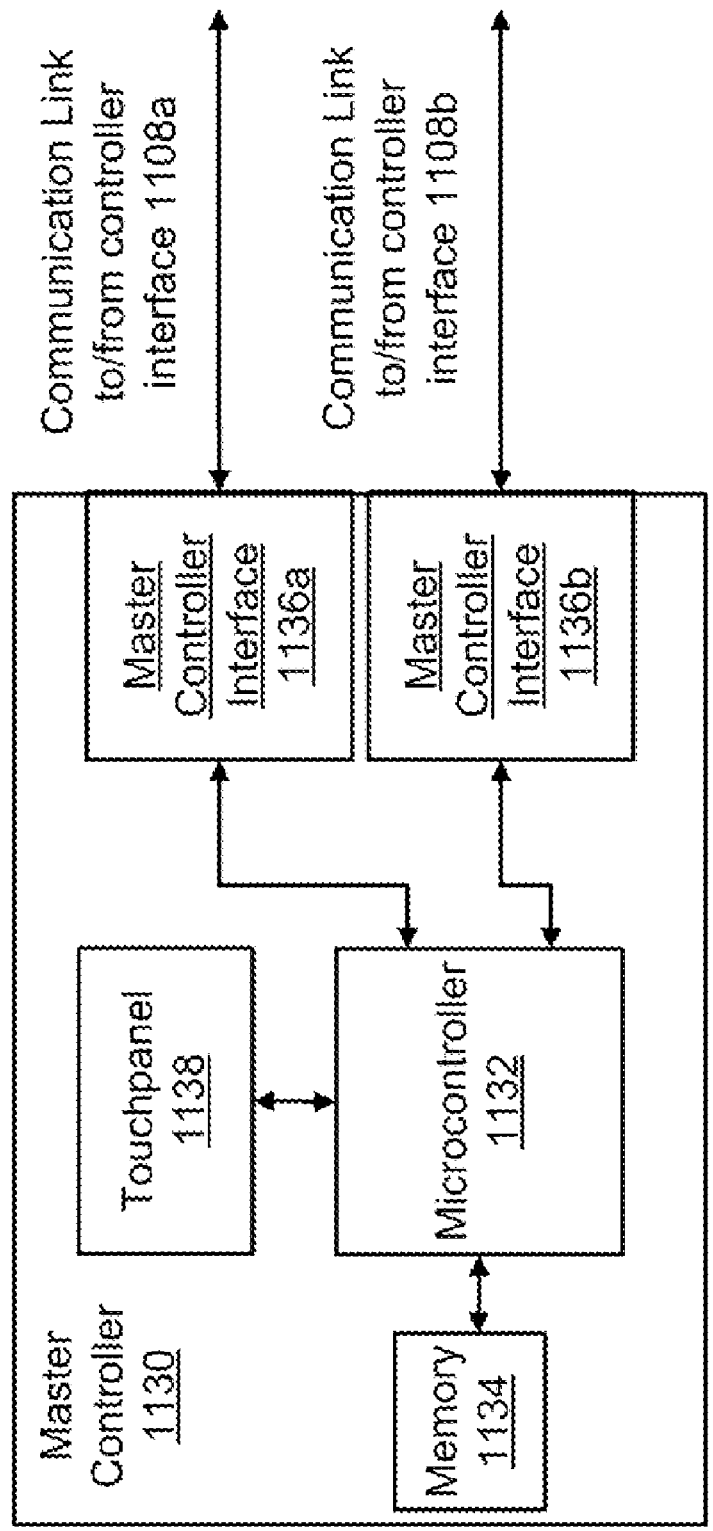
FIG. 11b is an illustrative block diagram of the master controller of FIG. 11A.

Referring to FIG. 11B, in one embodiment, a block diagram of the master controller 1130 is shown. The master controller 1130 includes a microcontroller 1132, a memory 1134 in communication with the microcontroller 1132, and master controller interfaces 1136a and 1136b also in communication with the microcontroller 1132. The master controller interfaces 1136a and 1136b are communication ports that each employ at least one of a wired (e.g., serial, I2C, USB, PS/2) and wireless (e.g., WiFi, Bluetooth, IR) communication protocol, or any other similar communication protocol known in the art, and provide a communication link between the master controller 1130 and the motor controllers 1112a and 1112b. In other embodiments, the master controller 1130 includes more master controller interfaces that provide links between the master controller 1130 and more motor controllers.

The master controller 1130 further includes a touchpanel 1138 or key pad and screen, which allows a user to control and/or configure/program each motor controller 1112a, 1112b separately to raise or lower the roller shades 1140a, 1140b, and/or to calibrate the motor controllers 1112a, 1112b and sensor assemblies 1120a, 1120b. In addition to enabling a user to control each roller shade 1140a, 1140b separately, the master controller 1130 also enables a user to synchronize the movement of the roller shades 1140*a*, 1140*b*. More specifically, the master controller 1130 controls the motor controllers 1112*a*, 1112*b* to simultaneously raise or lower each of the roller shades 1140*a*, 1140*b* (using variable velocity profiles) so that both roller shades 1140*a*, 1140*b* arrive at the same (common) final (selected) position at the same time regardless of each shade's starting position.

Figure 12A:
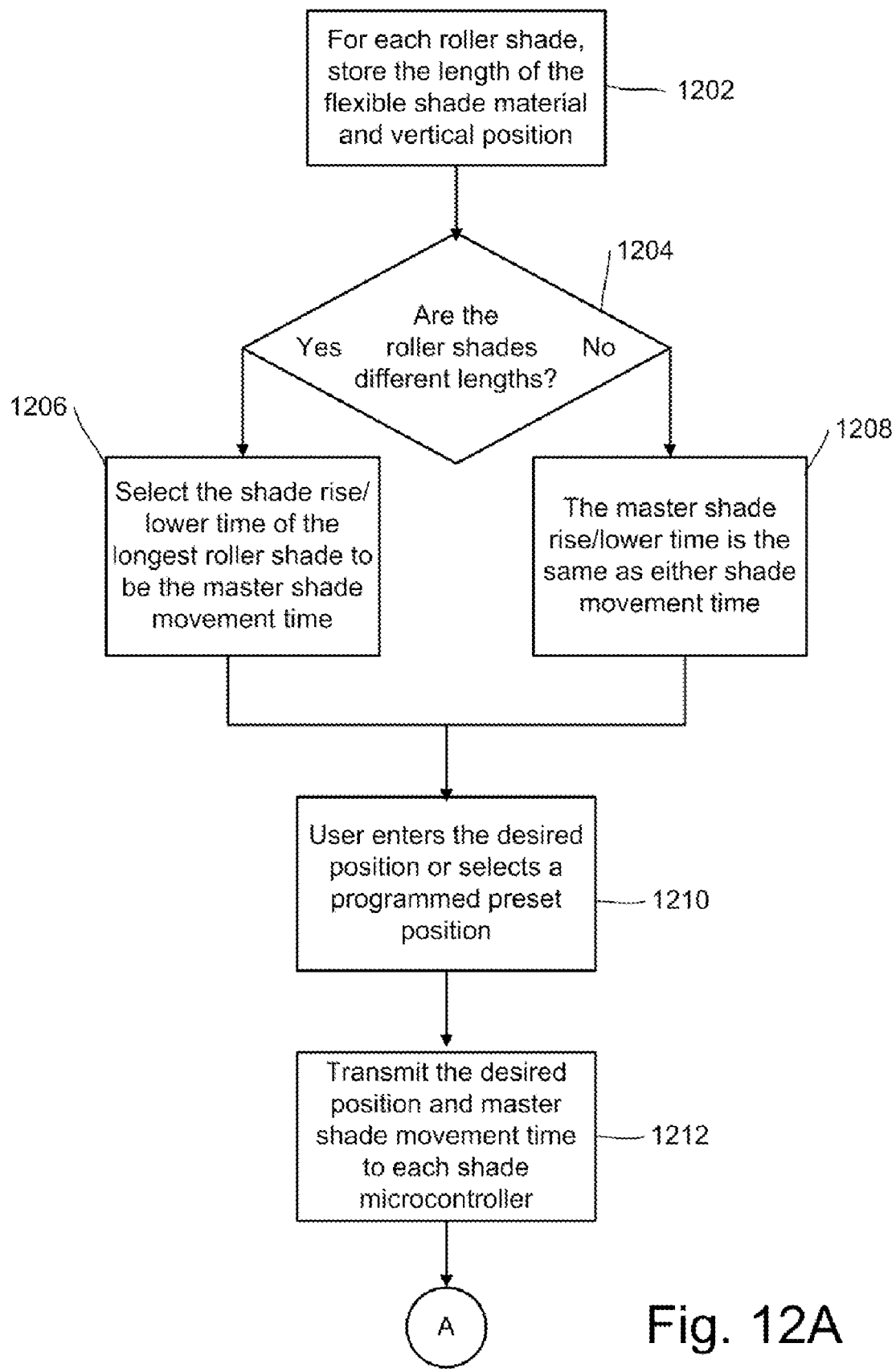
FIGS. 12A-12B are illustrative flow diagrams of the steps for synchronizing the movement of a plurality of roller shade from different first positions to a same second position, according to one embodiment of the invention.
Figure 12B:
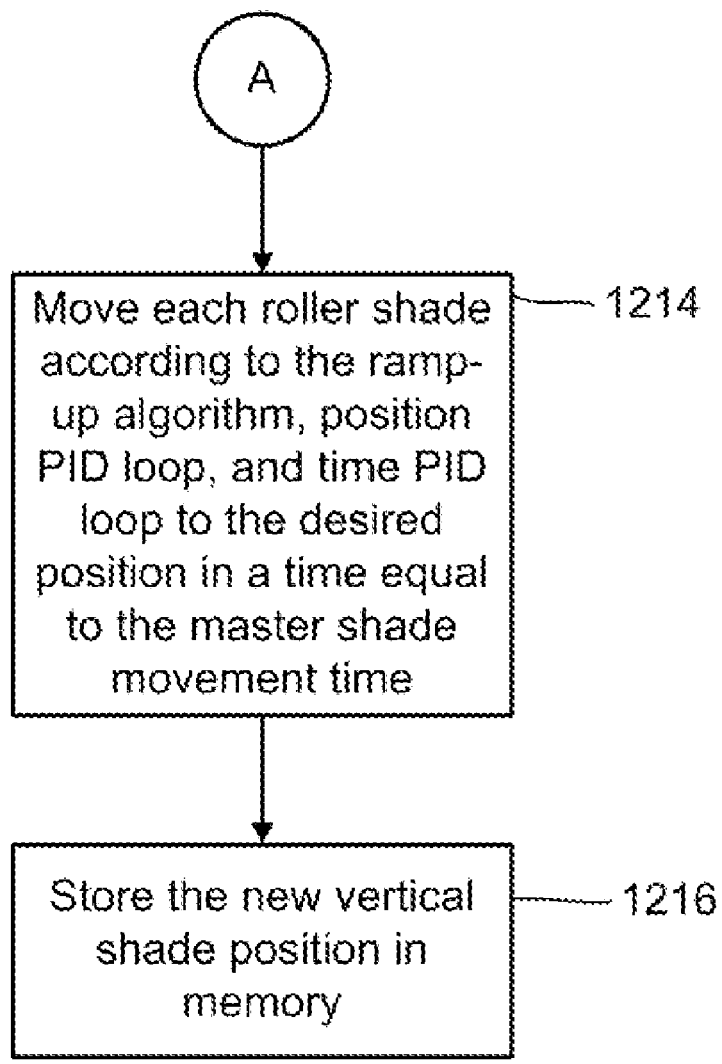

Referring to FIG. 12A-12B, after each roller shade system (I.e., motor controller 1112*a* and sensor assembly 1120*a*, and motor controller 1112*b* and sensor assembly 1120*b*) has been calibrated as described in detail hereinabove, the length L of each flexible shade material 1144*a*, 1144*b* and the current vertical position of the lower end 1146*a*, 1146*b* of each flexible shade material 1144*a*, 1144*b* are read from memory 1106*a* and memory 1106*b*, respectively, and stored in the master controller memory 1134 (Step 1202).

If the roller shades 1140*a*, 1140*b* are of different lengths (Step 1204), the microcontroller 1132 selects the shade rise/lower time (i.e., shade movement time) of the longest roller shade to be the shade rise/lower time for both roller shades 1140*a*, 1140*b* and stores this shade rise/lower time in the memory 1134 as the master shade movement time (Step 1206). In other words, the master shade movement time is the shade rise/lower time (i.e., shade movement time) for both the roller shades 1140*a*, 1140*b* when the roller shades 1140*a*, 1140*b* are moved synchronously, and overrides any different shade rise/lower time stored in memory 1106*a* or memory 1106*b*, which would be used only if the respective roller shade were moved separately.

If the roller shades 1140*a*, 1140*b* are the same length, and the shade rise/lower time for both shades is the same, and the microcontroller 1132 simply stores this shade rise/lower time in the memory 1134 as the master shade movement time (Step 1208). If the shade rise/lower times for the roller shades 1140*a*, 1140*b* are different, the microcontroller 1132 stores either the longer or shorter shade rise/lower time in the memory 1134 as the master shade movement time depending on user preference.

To move the roller shades 1140*a*, 1140*b* to a desired position, the user enters the desired position or selects a programmed preset position via the touchpanel 1138 (Step 1210). The microcontroller 1132 transmits the desired/selected position and master shade movement time to each microcontroller 1102*a*, 1102*b* (Step 1212).

Thereafter, as previously described in detail above (e.g. see FIGS. 10A-10B), the microcontroller 1102*a* uses the desired/selected position, master shade movement time, and shade position displacement data ($\Delta Y$) received from the sensor/DSP of the sensor assembly 1120*a* (as the flexible shade material 1144*a* moves) as inputs to a velocity ramp-up algorithm and as inputs to position and time PID loops. The microcontroller 1102*a* uses the ramp-up algorithm and the position and time PID loops to determine the instantaneous voltage applied to the motor 1110*a* to move the lower end 1146*a* of the flexible shade material 1144*a* from its starting to position to the desired position in a time that is equal to the master shade movement time (Step 1214). As a result, the speed of the motor 1110*a* first increases from zero to some optimum value based on the distance the lower end 1146*a* of the flexible shade material 1144*a* is to be moved. The speed of the motor 1110*a* is then slowly decreased to zero and thus the linear velocity of the flexible shade material 1144*a* is slowly decreased to zero as the lower end 1146*a* of the flexible shade material 1144*a* reaches the desired position. After the lower end 1146*a* of the flexible shade material 1144*a* reaches the desired position, the new vertical position is stored in memory 1106*a* and memory 1134 (Step 1216).

Likewise, the microcontroller 1102*b* uses the desired/selected position, master shade movement time, and shade position displacement data ($\Delta Y$) received from the sensor/DSP of the sensor assembly 1120*b* (as the flexible shade material 1144*b* moves) as inputs to a velocity ramp-up algorithm and as inputs to position and time PID loops. The microcontroller 1102*b* uses the velocity ramp-up algorithm and the position and time PID loops to determine the instantaneous voltage applied to the motor 1110*b* to move the lower end 1146*b* of the flexible shade material 1144*b* from its starting to position to the desired position in a time that is equal to the master shade movement time (Step 1214). As a result, speed of the motor 1110*b* first increases from zero to some optimum value based on the distance the lower end 1146*b* of the flexible shade material 1144*b* is to be moved. The speed of the motor 1110*a* is then slowly decreased to zero and thus the linear velocity of the flexible shade material 1144*b* is slowly decreased to zero as the lower end 1146*b* of the flexible shade material 1144*b* reaches the desired position. After the lower end 1146*b* of the flexible shade material 1144*b* reaches the desired position, the new vertical position is stored in memory 1106*b* and memory 1134 (Step 1216).

In other words, the varying linear velocity of a particular roller shade is based on the distance that the particular roller shade has to move in order to reach the desired position. Consequently, when the starting position of one of the two roller shades is closer to the desired position than the starting position of the other of the two roller shades, the roller shade with the closer starting position will move more slowly than the roller shade with the farther starting position so that both roller shades arrive at the desired position at the same time.

For example, if one particular roller shade was previously opened half way (i.e., 50 percent open/raised), while the other roller shade was left fully closed/drawn, and a user chooses to fully raise both roller shades, the roller shade previously opened half way has to move only half the distance that the fully closed/drawn roller shade has to move to reach a fully raised position. Consequently, the fully closed roller shade will move faster than the half raised roller shade because the fully closed roller shade has to move two times the distance that the half raised roller shade has to move to reach the desired position in a time equal to the master shade movement time.

Depending on the starting vertical positions of the two roller shades, to reach the desired position, both roller shades may move in the same direction, or one shade may move down (unwind) while the other roller shade may move up (wind). For example, if the desired position for the two roller shades was half way open (i.e., 50 percent raised) and the starting position of one of the two roller shades was fully open/raised, while the starting position of the other of the two roller shades was fully closed/drawn, the fully raised roller shade would unwind (close), while the fully closed roller shade would simultaneously wind up (open) until both roller shades reach the desired position of half open.

Figure 13A:
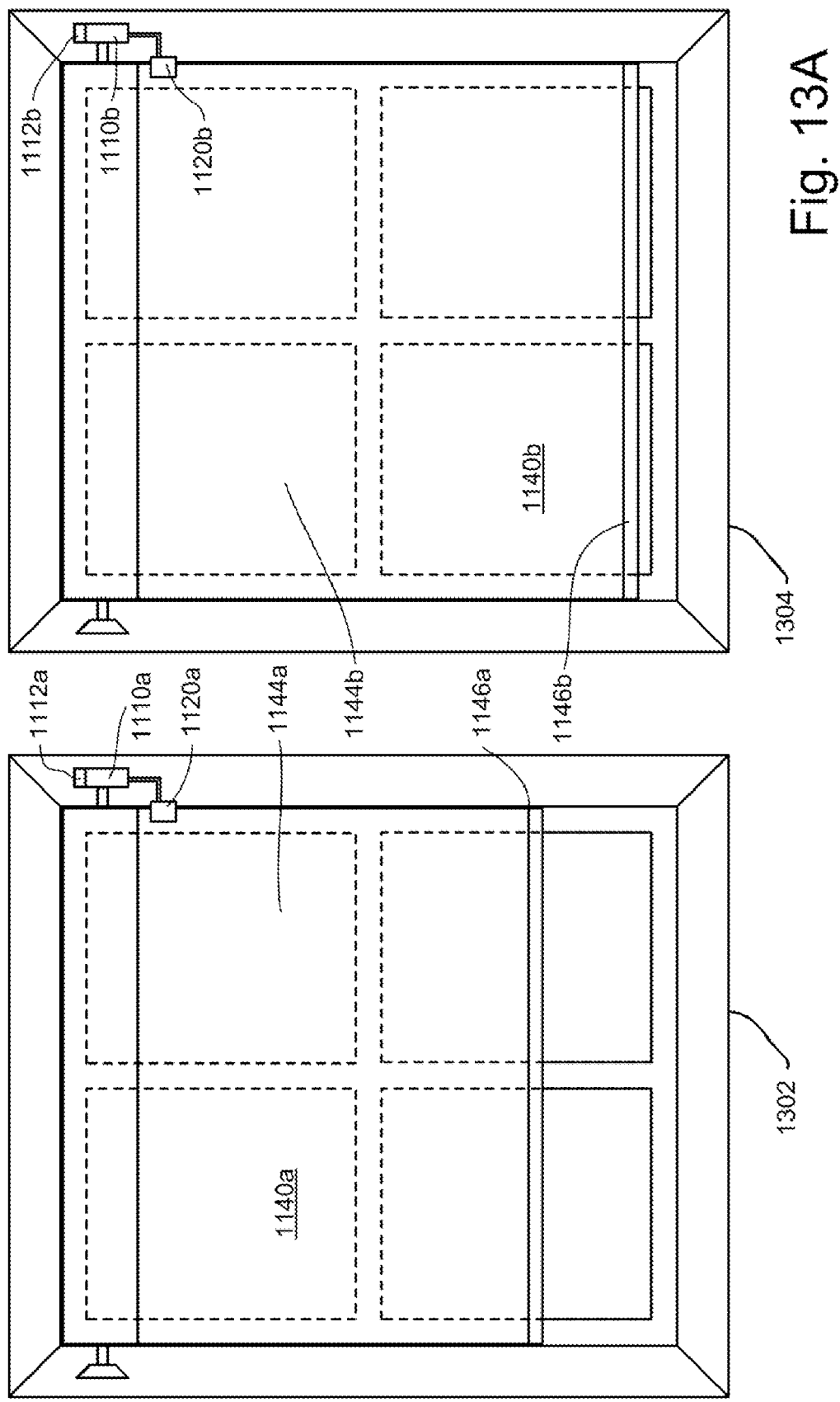
FIGS. 13A-13C are illustrative front views of a roller shade, motor assembly, and sensor assembly mounted in two different window frames, with the lower end of each roller shade disposed in various vertical positions between a fully open and a fully closed position.
Figure 13B:
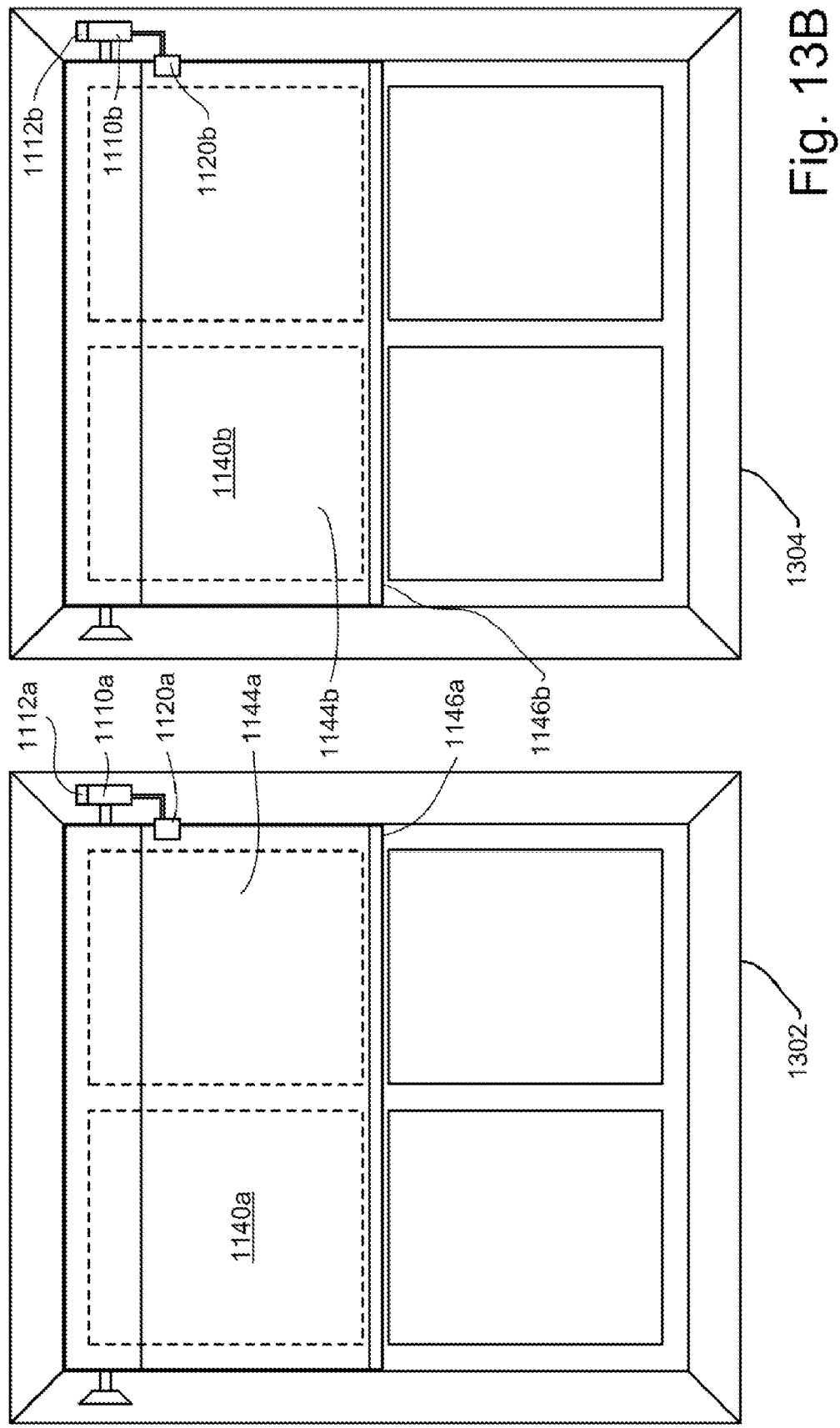
Figure 13C:
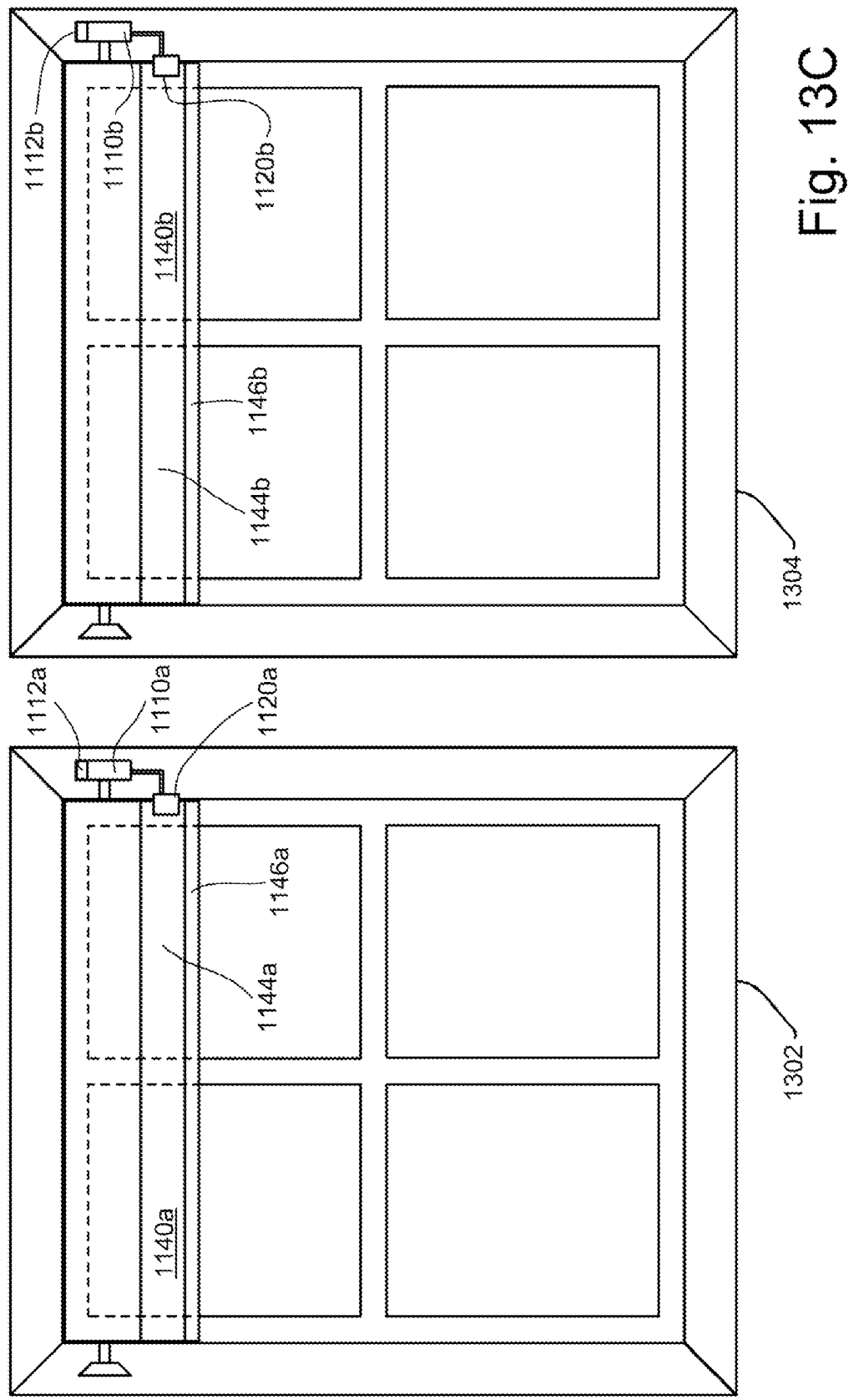

Referring to FIGS. 13A-13C, as a further example, a first window frame 1302 and a second window frame 1304 are shown. The first window frame 1302 has mounted therein the roller shade 1140*a*, the motor 1110*a*, the motor controller 1112*a*, and the sensor assembly 1120*a*. The second window frame 1304 has mounted therein the roller shade 1140*b*, the motor 1110*b*, the motor controller 1112*b*, and the sensor assembly 1120*b*.

As shown in FIG. 13A, the starting position of the roller shade 1140*a* is higher (more open) than the starting position of the roller shade 1140*b* (i.e., the lower end 1146*a* of the flexible shade material 1144*a* is higher than the lower end 1146b of the flexible shade material 1144b). First assume that both roller shades 1140a, 1140b are the same length and have the same shade movement time. Then assume that a user wishes to move synchronously both roller shades 1140a, 1140b to a fully open position. The user inputs this desired position into the master controller 1130 via the touchpanel 1138.

The microcontroller 1132 first stores the shade rise/lower time from either of the roller shades 1140a, 1140b in the memory 1134 as the master shade movement time. The shade microcontroller 1132 then transmits the desired/selected position and master shade movement time to each microcontroller 1102a, 1102b.

The microcontroller 1102a uses the desired/selected position, master shade movement time, and shade position displacement data ($\Delta Y$) received from the sensor/DSP of the sensor assembly 1120a as inputs to the velocity ramp-up algorithm and as inputs to the position and time PID loops. The speed of the motor 1110a increases from zero to some optimum value based on the distance the lower end 1146a of the flexible shade material 1144a is to be moved. Similarly, the microcontroller 1102b also uses the desired/selected position, master shade movement time, and shade position displacement data ($\Delta Y$) received from the sensor/DSP of the sensor assembly 1120b as inputs to the velocity ramp-up algorithm and as inputs to the position and time PID loops. The speed of the motor 1110b increases from zero to some optimum value based on the distance the lower end 1146b of the flexible shade material 1144b is to be moved.

Since the lower end 1146a of the roller shade 1140a has a starting position that is closer to the desired/destination position than the starting position of the lower end 1146b of the roller shade 1140b, the flexible shade material 1144a initially has a slower linear velocity than the linear velocity of the flexible shade material 1144b. Since the flexible shade material 1144b moves faster than the flexible shade material 1144a, the lower end 1146b of the roller shade 1140b catches up with the lower end 1146a of the roller shade 1140a, as shown in FIG. 13B. From that point on, the flexible shade material 1144a and the flexible shade material 1144b move at the same variable linear velocity since the lower ends of both roller shades have the same distance to move to reach the desired position.

The speeds of the motors 1110a and 1110b are slowly decreased to zero, and thus the linear velocities of the flexible shade material 1144a and the flexible shade material 1144b are slowly decreased to zero as the lower end 1146a and the lower end 1146b reach the desired position at the same time, as shown in FIG. 13C.

In the previous example, the lower end 1146b of the roller shade 1140b was close enough to the lower end 1146a of the roller shade 1140a to catch up with the lower end 1146a of the roller shade 1140a so that both lower ends 1146a and 1146b moved together for over half the distance to the desired/destination position. However, depending on the distance separating the lower ends 1146a and 1146b, this may not always happen. If the distance between the lower ends 1146a and 1146b is too great, the lower end that is farthest from the desired position may not catch up to the lower end that is closer to the desired position until the both lower ends 1146a and 1146b actually reach the desired position at the same time. In other words, the lower ends 1146a and 1146b of the roller shades 1140a and 1140b, respectively, may not always travel together (or in the same direction), but the lower ends 1146a and 1146b will always arrive at the desired position at the same time, regardless of their respective starting positions.

List of Acronyms Used in the Detailed Description of the Invention

The following is a list of the acronyms used in the specification in alphabetical order.
CCD charge coupled device
CMOS complementary metal oxide semiconductor
PID proportional integral derivative
PTFE polytetrafluoroethylene
PWM pulse width modulation
RPM rotations per minute
VCSEL vertical cavity surface emitting laser
WiFi Wireless Fidelity Alternate Embodiments Alternate embodiments may be devised without departing from the spirit or the scope of the invention.

What is claimed is:

1. A system for synchronizing movement of a plurality of roller shades each disposed at a first position to a common second position, each of the plurality of roller shades including a flexible shade material having a lower end and a rotatably supported roller tube windingly receiving the flexible shade material, the system comprising:
  a master controller;
  a plurality of optical assemblies each configured for obtaining information related to the position of an associated one of the plurality of roller shades, each of the plurality of optical assemblies comprising an optical sensor configured for capturing an image frame of the flexible shade material of the associated one of the plurality of roller shades at a plurality of linear positions along the flexible shade material as the lower end of the flexible shade material moves between the first position and the common second position; and
  a plurality of motor assemblies each configured for:
    receiving the position information from an associated one of the plurality of optical assemblies,
    receiving a master shade movement time from the master controller, and
    moving the associated one of the plurality of roller shades from the first position to the common second position in response to the received position information so that the associated one of the plurality of roller shades arrives at the common second position simultaneously with the other of the plurality of roller shades in a time equal to the master shade movement time.

2. The system of claim 1, wherein the master controller is further configured for retrieving a shade movement time from each of the plurality of motor assemblies and selecting the longest shade movement time as the master shade movement time.

3. The system of claim 1, wherein each of the plurality of motor assemblies is further configured for transmitting the position information to the master controller.

4. The system of claim 1, wherein each of the plurality of optical assemblies further comprises a digital signal processor configured for processing the plurality of captured image frames of the flexible shade material of the associated one of the plurality of roller shades to determine changes in position of the flexible shade material as the lower end of the flexible shade material moves between the first position and the common second position.

5. The system of claim 1, wherein each of the plurality of optical assemblies further comprises a light source configured for illuminating the flexible shade material of the associated one of the plurality of roller shades moving past the optical sensor.

6. The system of claim 5, wherein the light source comprises one of an incandescent light, a light emitting diode, or a vertical cavity surface emitting laser.

7. The system of claim 1, wherein the optical sensor comprises one of a high speed digital camera, a charge coupled device, or a complementary metal oxide semiconductor detector.

8. The system of claim 1, wherein each of the plurality of motor assemblies comprises a motor controller and an associated reversible motor configured for operably engaging the roller tube of the associated one of the plurality of roller shades to rotate the roller tube to move the lower end of the flexible shade material of the associated one of the plurality of roller shades between the first position and the common second position.

9. The system of claim 8, wherein each of the plurality of motor controllers comprises a microcontroller configured for controlling the associated reversible motor to move the lower end of the flexible shade material of the associated one of the plurality of roller shades from the first position to the common second position in response to the position information from the one of the plurality of optical assemblies.

10. The system of claim 8, wherein each of the plurality of motor controllers is configured for controlling the associated reversible motor to move the lower end of the flexible shade material of the associated one of the plurality of roller shades from the first position to the second position using a proportional integral derivative (PID) loop.

11. The system of claim 8, wherein each of the plurality of motor controllers is configured for controlling the associated reversible motor to move the lower end of the flexible shade material of the associated one of the plurality of roller shades from the first position to the common second position at a variable linear velocity.

12. The system of claim 11, wherein the variable linear velocity varies according to one of an exponential function, a ramp function, or a Gaussian function.

13. The system of claim 8, wherein each of the plurality of motor controllers comprises a controller interface comprising a communication port that employs at least one of a wired and wireless communication protocol.

14. The system of claim 13, wherein the communication protocol comprises at least one of serial, I2C, USB, PS/2, Wi-Fi, Bluetooth, and infrared.

15. The system of claim 1, wherein the master controller comprises a plurality of master controller interfaces each comprising a communication port that employs at least one of a wired and wireless communication protocol.

16. The system of claim 15, wherein the communication protocol comprises at least one of serial, I2C, USB, PS/2, Wi-Fi, Bluetooth, and infrared.

17. The system of claim 1, wherein the master controller comprises a microcontroller configured for controlling the plurality of motor assemblies.

18. The system of claim 1, wherein the master controller comprises a touchpanel.

19. The system of claim 1, wherein the master controller comprises a memory configured for storing the master shade movement time and position information for each of the plurality of roller shades.

20. A system for synchronizing movement of a plurality of roller shades each disposed at a first position to a common second position, each of the plurality of roller shades including a flexible shade material having a lower end and a rotatably supported roller tube windingly receiving the flexible shade material, the system comprising:
    a master controller;
    a plurality of optical assemblies each configured to obtain information related to the position of an associated one of the plurality of roller shades, each of the plurality of optical assemblies comprising an optical sensor configured for capturing an image frame of the flexible shade material of the associated one of the plurality of roller shades at a plurality of linear positions along the flexible shade material as the lower end of the flexible shade material moves between the first position and the common second position; and
    a plurality of motor assemblies each configured for:
        receiving the position information from an associated one of the plurality of optical assemblies,
        receiving a master shade movement time from the master controller, and
        moving the associated one of the plurality of roller shades from the first position to the common second position at a variable linear velocity in response to the received position information so that the associated one of the plurality of roller shades moves from the first position to the common second position and arrives at the common second position simultaneously with the other of the plurality of roller shades in a time equal to the master shade movement time.

21. The system of claim 20, wherein the master controller is further configured for retrieving a shade movement time from each of the plurality of motor assemblies and selecting the longest shade movement time as the master shade movement time.

22. The system of claim 20, wherein each of the plurality of motor assemblies is further configured for transmitting the position information to the master controller.

23. The system of claim 20, wherein each of the plurality of optical assemblies further comprises a digital signal processor configured for processing the plurality of captured image frames of the flexible shade material of the associated one of the plurality of roller shades to determine changes in position of the flexible shade material as the lower end of the flexible shade material moves between the first position and the common second position.

24. The system of claim 20, wherein each of the plurality of optical assemblies further comprises a light source configured for illuminating the flexible shade material of the one of the plurality of roller shades moving past the optical sensor.

25. The system of claim 24, wherein the light source comprises one of an incandescent light, a light emitting diode, or a vertical cavity surface emitting laser.

26. The system of claim 20, wherein the optical sensor comprises one of a high speed digital camera, a charge coupled device, or a complementary metal oxide semiconductor detector.

27. The system of claim 20, wherein each of the plurality of motor assemblies comprises a motor controller and an associated reversible motor configured for operably engaging the roller tube of the associated one of the plurality of roller shades to rotate the roller tube to move the lower end of the flexible shade material of the associated one of the plurality of roller shades between the first position and the common second position.

28. The system of claim 27, wherein each of the plurality of motor controllers comprises a microcontroller configured for controlling the associated reversible motor to move the lower end of the flexible shade material of the one of the plurality of roller shades from the first position to the common second position in response to the position and movement information from the one of the plurality of optical assemblies.

29. The system of claim 27, wherein each of the plurality of motor controllers is configured for controlling the associated reversible motor to move the lower end of the flexible shade material of the associated one of the plurality of roller shades from the first position to the second position using a proportional integral derivative (PID) loop.

30. The system of claim 27, wherein the motor controller comprises a controller interface comprising a communication port that employs at least one of a wired and wireless communication protocol.

31. The system of claim 27, wherein the communication protocol comprises at least one of serial, I2C, USB, PS/2, Wi-Fi, Bluetooth, and infrared.

32. The system of claim 20, wherein the variable linear velocity varies according to one of an exponential function, a ramp function, or a Gaussian function.

33. The system of claim 20, wherein the master controller comprises a plurality of master controller interfaces each comprising a communication port that employs at least one of a wired and wireless communication protocol.

34. The system of claim 33, wherein the communication protocol comprises at least one of serial, I2C, USB, PS/2, Wi-Fi, Bluetooth, and infrared.

35. The system of claim 20, wherein the master controller comprises a microcontroller configured for controlling the plurality of motor assemblies.

36. The system of claim 20, wherein the master controller comprises a touchpanel.

37. The system of claim 20, wherein the master controller comprises a memory configured for storing the master shade movement time and position information for each of the plurality of roller shades.

* * * * *